(12) United States Patent
Murayama et al.

(10) Patent No.: US 8,850,810 B2
(45) Date of Patent: Oct. 7, 2014

(54) VEHICULAR HYDRAULIC-PRESSURE-GENERATION DEVICE AND VEHICULAR BRAKING-FORCE GENERATION DEVICE

(75) Inventors: Kazuaki Murayama, Saitama (JP); Arata Inoue, Saitama (JP); Takaaki Ohnishi, Saitama (JP); Nobutake Hyodo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/003,897

(22) PCT Filed: Mar. 9, 2012

(86) PCT No.: PCT/JP2012/056058
§ 371 (c)(1),
(2), (4) Date: Sep. 9, 2013

(87) PCT Pub. No.: WO2012/124617
PCT Pub. Date: Sep. 20, 2012

(65) Prior Publication Data
US 2014/0000254 A1    Jan. 2, 2014

(30) Foreign Application Priority Data

| Mar. 11, 2011 | (JP) | 2011-053662 |
| Mar. 11, 2011 | (JP) | 2011-053663 |
| Mar. 11, 2011 | (JP) | 2011-053861 |
| Feb. 8, 2012  | (JP) | 2012-025134 |

(51) Int. Cl.
*B60T 11/16* (2006.01)
*F15B 15/00* (2006.01)
*B60T 7/04* (2006.01)
*B60T 8/40* (2006.01)
*B60T 13/66* (2006.01)
*B60T 13/14* (2006.01)
*F16F 1/373* (2006.01)
*B60T 13/68* (2006.01)

(52) U.S. Cl.
CPC ............... *F15B 15/00* (2013.01); *B60T 7/042* (2013.01); *B60T 8/4081* (2013.01); *B60T 8/409* (2013.01); *B60T 13/662* (2013.01); *B60T 13/145* (2013.01); *F16F 1/3732* (2013.01); *B60T 13/686* (2013.01)
USPC ............................................ 60/553; 60/562

(58) Field of Classification Search
USPC .................... 60/547.1, 545, 552, 553, 562
See application file for complete search history.

(56) References Cited

U.S. PATENT DOCUMENTS

| 6,058,705 | A |  5/2000 | Schunck |
| 6,672,685 | B2* | 1/2004 | Ishimura et al. ........... 303/113.4 |
| 7,003,954 | B2* | 2/2006 | Ogiwara et al. ................ 60/568 |
| 7,008,023 | B2* | 3/2006 | Nakashima et al. ............. 60/562 |
| 7,322,657 | B2* | 1/2008 | Matsuhashi ................ 303/113.4 |
| 7,651,176 | B2* | 1/2010 | Inoue et al. ................. 303/114.1 |
| 7,997,665 | B2 | 8/2011 | Nakazawa |
| 2002/0140286 | A1 | 10/2002 | Ishimura et al. |
| 2004/0181381 | A1 | 9/2004 | Matsuhashi |
| 2007/0018498 | A1 | 1/2007 | Nakazawa |
| 2011/0049972 | A1 | 3/2011 | Tsuji |

FOREIGN PATENT DOCUMENTS

| EP | 1 970 271 A1 | 9/2008 |
| FR | 2837455 A1 | 9/2003 |
| JP | 2002-293229 A | 10/2002 |
| JP | 2004-276666 A | 10/2004 |
| JP | 2004-330966 A | 11/2004 |
| JP | 2005-329872 A | 12/2005 |
| JP | 2006-001351 A | 1/2006 |
| JP | 2006-248473 A | 9/2006 |
| JP | 2007-022351 A | 2/2007 |
| JP | 2007-210372 A | 8/2007 |
| JP | 2009-073478 A | 4/2009 |
| JP | 2009-227172 A | 10/2009 |
| JP | 2009-286290 A | 12/2009 |
| WO | 2011/027386 A1 | 3/2011 |

OTHER PUBLICATIONS

Extended European Search Report dated Jul. 23, 2014 issued over the counterpart EP Patent Application 12758183.3.

* cited by examiner

*Primary Examiner* — Thomas E Lazo
(74) *Attorney, Agent, or Firm* — Carrier Blackman & Associates, P.C.; Joseph P. Carrier; Fulchand P. Shende

(57) ABSTRACT

A vehicular hydraulic-pressure-generation device wherein a first bush compressively deforms due to pressure from a simulator piston that moves when hydraulic pressure produced when a brake pedal is depressed is transmitted into a cylinder part. Said vehicular hydraulic-pressure-generation device thus creates artificial reaction-force characteristics with respect to the position of the brake pedal. The aforementioned first bush has a third elastic modulus, which is smaller than a second elastic modulus, and is provided in parallel with a first return spring. The compressive deformation of the first bush occurs over a second region that overlaps a first region in which compressive deformation of the return spring primarily occurs. This makes the brake pedal move more smoothly, reducing the feeling of incongruity resulting from a V-shaped singularity in the reaction-force characteristics with respect to brake pedal position.

6 Claims, 14 Drawing Sheets

US 8,850,810 B2

VEHICULAR HYDRAULIC-PRESSURE-GENERATION DEVICE AND VEHICULAR BRAKING-FORCE GENERATION DEVICE

TECHNICAL FIELD

The present invention related to a vehicular hydraulic-pressure generation device for creating a pseudo reaction force corresponding to an operation amount of a brake, and a vehicular braking-force generation device provided with this vehicular hydraulic-pressure-generation device.

BACKGROUND ART

For example, for a hybrid vehicle, instead of a conventional brake system, which operates a brake through a hydraulic pressure, adopted is a brake system of a by-wire type that operates a brake through an electrical signal. Such a brake system of a by-wire type is provided with a stroke simulator that creates a pseudo reaction force corresponding to an operation amount of a brake pedal so as not to make the operation feeling of the brake pedal different from that of a conventional brake system (for example, see Patent Literature 1).

As an example of such a stroke simulator, the present applicant of the present application has presented a stroke simulator configured by disposing, serially to each other, a first elastic member having a first elastic modulus and a second elastic member having a second elastic modulus larger than the first elastic modulus (for example, see Patent Literature 2).

By the stroke simulator according to Patent Literature 2, regarding reaction force characteristic against the operation amount of a brake, it is possible to create an appropriate reaction force corresponding to the operation amount of the brake such as to create a small reaction in case the operation amount is small and a large reaction force in case the operation amount is large.

BACKGROUND ART DOCUMENTS

Patent Literatures

Patent Literature 1: JP2007-210372 A
Patent Literature 2: JP2009-073478 A

DISCLOSURE OF THE INVENTION

Problems to be Solved by the Invention

However, for the stroke simulator according to Patent Literature 2, a first elastic member having a first elastic modulus and a second elastic member having a second elastic modulus are disposed serially to each other wherein the second elastic modulus is set larger than the first elastic modulus. As the first elastic modulus and the second elastic modulus are different from each other, a singularity of a dogleg shape is generated at a portion (hereinafter, referred to as 'a switching point') where the reaction force linear characteristic according to the first elastic modulus and the reaction force linear characteristic according to the second elastic modulus are switched therebetween. The presence of the singularity generated at this switching point possibly causes a feeling of strangeness when the brake is operated.

The present invention has been developed in this situation, and an object of the present invention is to provide a vehicular hydraulic-pressure generation device and a vehicular braking-force generation device capable of reducing a feeling of strangeness that is caused, when a brake is operated, by a singularity of a dogleg shape generated at a switching point at which the reaction force linear characteristics according respectively to the first elastic modulus and the second elastic modulus are switched therebetween, the reaction force characteristics being against the operation amount of the brake.

Means for Solving the Problems

In order to attain the above-described object, in the invention according to claim 1, a vehicular hydraulic pressure generation device includes: a hydraulic pressure generation section for generating a hydraulic pressure corresponding to an operation amount of a brake operation member by a driver; and a reaction force generation section communicated with the hydraulic pressure generation section to generate a reaction force corresponding to the operation amount of the brake operation member, wherein the reaction force generation section includes: a simulator piston that is operated to move in a forward direction or in a backward direction, corresponding to the hydraulic pressure generated by the hydraulic pressure generation section; and an elastic portion provided on a side of the forward direction of the simulator piston, and wherein the elastic portion is formed by a first elastic portion having a first elastic modulus, a second elastic portion having a second elastic modulus larger than the first elastic modulus, and a third elastic portion having a third elastic modulus smaller than the second elastic modulus.

Advantage of the Invention

According to the present invention, regarding a reaction force characteristic against the operation amount of a brake operation member, it is possible to reduce a feeling of strangeness that is caused, when the brake is operated, by a singularity of a dogleg shape generated at a switching point at which the reaction force linear characteristics related to the first and second elastic modulus are switched therebetween, wherein the feeling of strangeness would occur if no solution were adopted.

EMBODIMENTS FOR CARRYING OUT THE INVENTION

Figure 1:
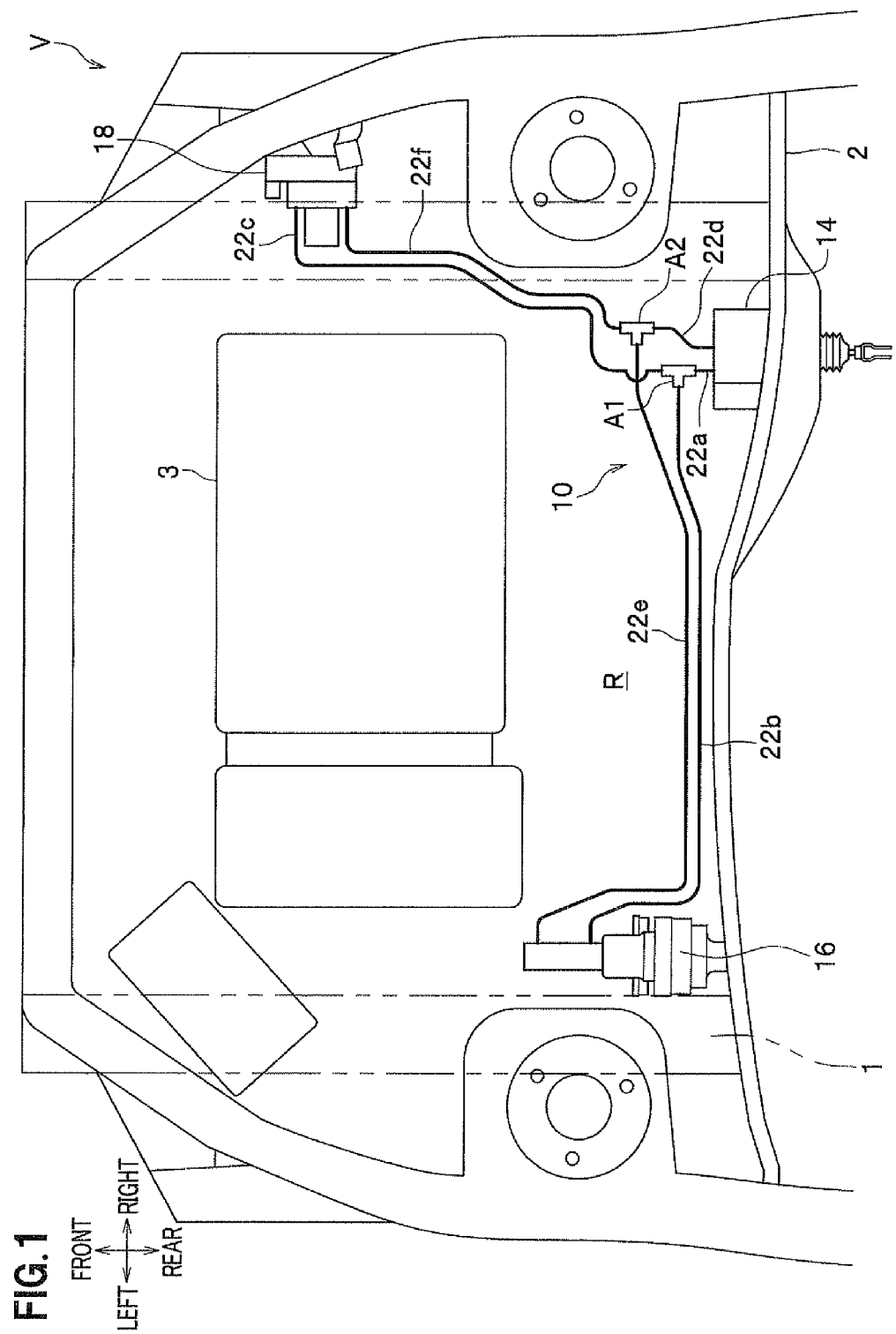
FIG. 1 shows layout configuration of a vehicular brake system on a vehicle, wherein an electric brake device is applied to the vehicular brake system.

In the following, plural embodiments according to the present invention will be described, referring to the drawings, as appropriate.

In the drawings, members given a common reference symbol are assumed to be members having a common function or a corresponding function. For the convenience of illustration, the size or shape of a member may be schematically shown with deformation or exaggeration.

[Layout Configuration of Elements of Vehicular Brake System 10]

First, the layout configuration of the elements of a vehicular brake system 10 will be described, referring to FIG. 1. FIG. 1 shows layout configuration of a vehicular brake system on a vehicle, wherein an electric brake device is applied to the vehicular brake system. Incidentally, the arrows in FIG. 1 represent the front/rear (forward/backward) and left/right directions of a vehicle V.

The vehicular brake system 10 (corresponding to 'a vehicular braking-force generation device' referred to in the present invention) 10 includes both a brake system of a by-wire type that operates a brake by transmitting an electrical signal for normal operation and a conventional hydraulic brake system that operates the brake by transferring a hydraulic pressure for fail-safe operation.

As shown in FIG. 1, the vehicular brake system 10 includes a vehicular hydraulic-pressure generation device (hereinafter, may also be referred to as 'a hydraulic-pressure generation device') 14 to which braking operation by an operator (driver) is input through a brake pedal (corresponding to 'a brake operation member' referred to in the present invention) 12, a motor cylinder device (corresponding to 'an electric hydraulic pressure generation section' referred to in the present invention) 16 for generating a brake pressure, based on an electrical signal corresponding to braking operation at least, and a vehicle stability assist device 18 (hereinafter, referred to as a VSA device 18 (VSA is a registered trade mark)) for assisting stabilization of vehicle behavior, based on the brake hydraulic pressure having been generated by the motor cylinder device 16.

Incidentally, the motor cylinder device 16 may be provided with configuration for generating a brake pressure, based on an electrical signal corresponding to a different physical amount, instead of configuration for generating a brake hydraulic pressure, based on an electrical signal corresponding to braking operation by a driver. In an automatic brake system for example without depending on a braking operation by a driver, an electrical signal corresponding to a different physical amount can be a control signal, wherein a state around the vehicle V is obtained by an ECU (Electronic Control Unit) through a CCD camera, a sensor or the like and determined by the ECU, and braking of the vehicle V is instructed by the control signal, according to a result of the determination.

The hydraulic-pressure generation device 14 is herein applied to a right-hand drive vehicle, and is fixed to the right side along the vehicle transverse direction of a dashboard 2 through a bolt or the like. The hydraulic-pressure generation device 14 may also be one applied to a left-hand drive vehicle.

The motor cylinder device 16 is disposed, for example, on the left side along the vehicle transverse direction, which is the side opposite to the hydraulic-pressure generation device 14, and is attached to a vehicle body 1 such as a side frame or the like on the left side through an attaching bracket (not shown).

The VSA device 18 is configured, being provided with functions, for example, an ABS (antilock brake system) function to prevent a wheel lock in braking, a TCS (traction control system) function to prevent spin-off of wheels in accelerating or the like, and a function to reduce transverse sliding in turning. For example, the VSA device 18 is attached to the vehicle body through a bracket at the front end on the right side along the vehicle transverse direction.

Incidentally, instead of the VSA device 18, an ABS device having an ABS function may be connected.

The hydraulic-pressure generation device 14, the motor cylinder device 16, and the VSA device 18 are disposed separately from each other with piping tubes 22a to 22f therebetween in a structure mounting room R, in which structures 3 such as an engine or a motor for running provided anterior to the dashboard 2 of a vehicle V are mounted. The internal detailed configurations of the hydraulic-pressure generation device 14, the motor cylinder device 16, and the VSA device 18 will be described later.

The vehicular brake system 10 is applicable to any one of a front-wheel drive vehicle, a rear-wheel drive vehicle, and a four-wheel drive vehicle. Further, for a by-wire bake system, the hydraulic-pressure generation device 14 and the motor cylinder device 16 are electrically connected with a control section such as the ECU and the like by a harness, not shown.

[Schematic Configuration of Vehicular Brake System 10]

Figure 2:
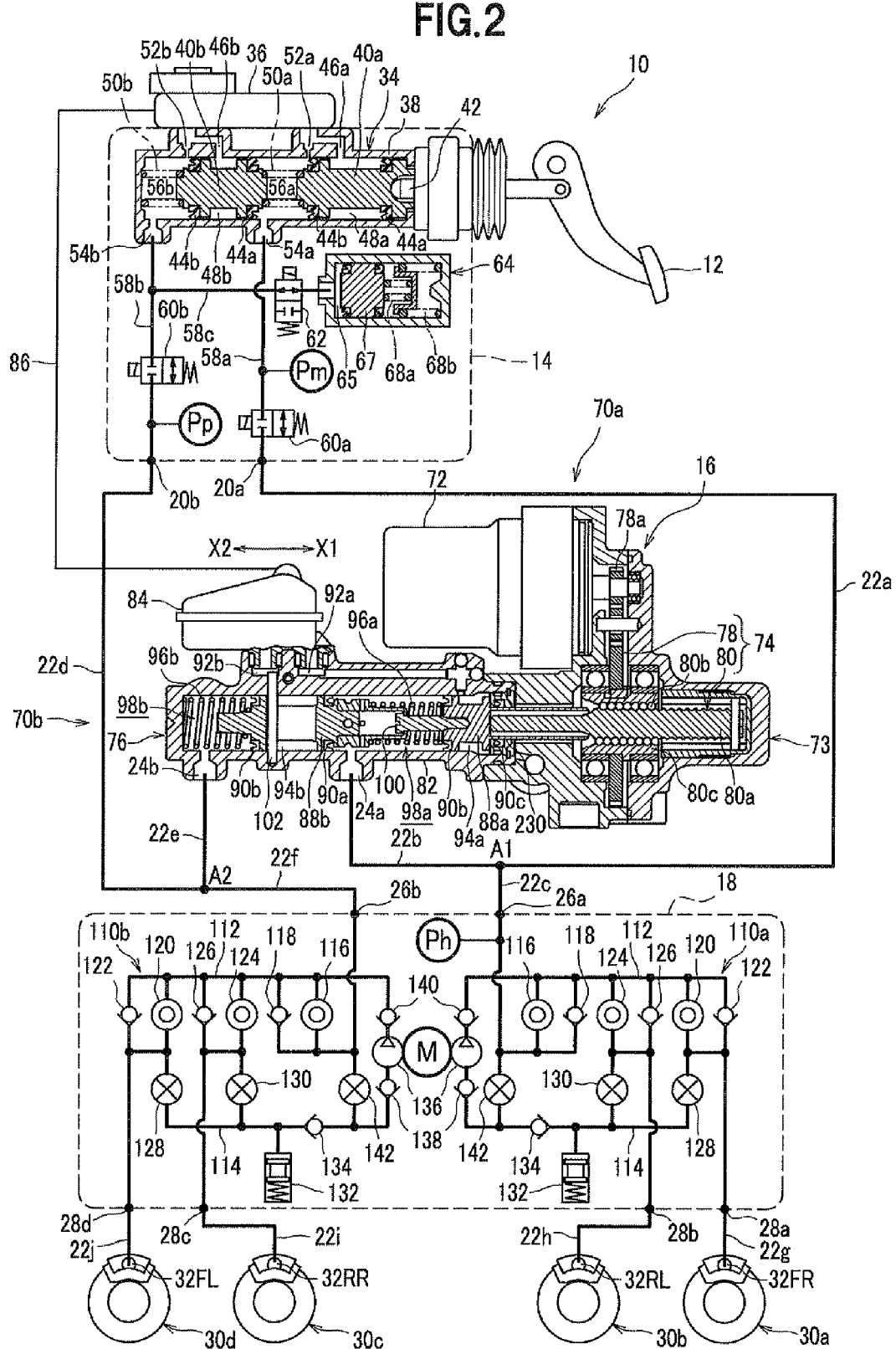
FIG. 2 shows a schematic configuration of the vehicular brake system.

FIG. 2 shows a schematic configuration of the vehicular brake system. First, hydraulic passages will be described. With a connection point A1 in FIG. 2 as a reference, a connection port 20a of the hydraulic-pressure generation device 14 and the connection point A1 are connected by a first piping tube 22a. Further, an output port 24a of the motor cylinder device 16 and the connection point A1 are connected by a second piping tube 22b. Still further, an inlet port 26a of the VSA device 18 and the connection point A1 are connected by a third piping tube 22c.

With another connection point A2 in FIG. 2 as a reference, another connection port 20b of the hydraulic-pressure generation device 14 and the connection point A2 are connected by a fourth piping tube 22d. Further, another output port 24b of the motor cylinder device 16 and the connection point A2 are connected by a fifth piping tube 22e. Still further, another inlet port 26b of the VSA device 18 and the connection point A2 are connected by a sixth piping tube 22f.

The VSA device 18 is provided with a plurality of outlet ports 28a to 28d. The first outlet port 28a is connected, by a seventh piping tube 22g, with a wheel cylinder 32FR of a disk brake mechanism 30a provided at the front wheel on the right side. The second outlet port 28b is connected, by an eighth piping tube 22h, with a wheel cylinder 32RL of a disk brake mechanism 30b provided at the rear wheel on the left side. The third outlet port 28c is connected, by a ninth piping tube 22i, with a wheel cylinder 32RR of a disk brake mechanism 30c provided at the rear wheel on the right side. The fourth outlet port 28d is connected, by a tenth piping tube 22j, with a wheel cylinder 32FL of a disk brake mechanism 30d provided at the front wheel on the left side.

In this case, brake fluid is supplied through the piping tubes 22g-22j connected with the respective outlet ports 28a-28d to the respective wheel cylinders 32FR, 32RL, 32RR, and 32FL of the disk brake mechanisms 30a-30d. A rise in the hydraulic pressure in the wheel cylinders 32FR, 32RL, 32RR, or 32FL operates the wheel cylinders 32FR, 32RL, 32RR, or 32FL, and a braking force is applied to the corresponding wheel (the right-side front wheel, the left-side rear wheel, the right-side rear wheel, or the left-side front wheel).

The vehicular brake system 10 is arranged to be mountable on various vehicles including, for example, a vehicle driven only by a reciprocating engine (internal combustion engine), a hybrid vehicle, an electric vehicle, and a fuel cell vehicle.

The hydraulic-pressure generation device 14 includes a tandem master cylinder (corresponding to 'a hydraulic-pressure generation section' referred to in the present invention) 34 for generating a hydraulic pressure by a driver's operation of the brake pedal 12 and a first reservoir 36 provided at the master cylinder 34. Inside a cylinder portion 38 of the master cylinder 34, a first piston 40a and second piston 40b are slidably arranged, wherein the two pistons 40a and 40b are separated from each other with a certain distance along the axial direction of the cylinder portion 38. The first piston 40a is disposed adjacent to the brake pedal 12 and is connected with the brake pedal 12 through a push rod 42. The second piston 40b is disposed with a longer distance than the first piston 40a from the brake pedal 12.

A pair of piton packings 44a and 44b is attached to the outer circumferential surface of each of the first piston 40a and the second piston 40b through an annular stepped portion. Back chambers 48a and 48b communicated with later-described supply ports 46a and 46b are formed between the paired packings 44a and 44b. Further, a spring member 50a is arranged between the first piston 40a and the second piston 40b, the spring member 50a connecting the first piston 40a and the second piston 40b. A second spring member 50b is arranged between the second piston 40b and inner wall portion of the cylinder tube 38, the second spring member 50b connecting the second piston 40b and the inner wall portion of the cylinder portion 38.

Instead of providing piston packings 44a and 44b on the outer circumferential surfaces of the first piston 40a and the second piston 40b, packings may be attached to the inner circumferential surface of the cylinder portion 38.

The cylinder portion 38 of the master cylinder 34 is provided with two supply ports 46a and 46b, two relief ports 52a and 52b, and two output ports 54a and 54b. In this case, the respective supply ports 46a, 46b, and the respective relief ports 52a, 52b, are arranged to respectively join with each other and communicate with a reservoir chamber, not shown, in the first reservoir 36.

Further, inside the cylinder portion 38 of the master cylinder 34, a first hydraulic chamber 56a and a second hydraulic chamber 56b are provided to generate a hydraulic brake pressure corresponding to a braking effort applied by the driver to the brake pedal 12. The first hydraulic chamber 56a is arranged such as to communicate with the connection port 20a through a first hydraulic passage 58a. The second hydraulic chamber 56b is arranged such as to communicate with the other connection port 20b through a second hydraulic passage 58b.

A pressure sensor Pm is provided between the master cylinder 34 and the connection port 20a and on the upstream side of the first hydraulic passage 58a. A first shut-off valve 60a of a solenoid valve of a normally open type is provided on the downstream side of the first hydraulic passage 58a. This pressure sensor Pm has a function to detect the hydraulic pressure of the upstream which is on the first hydraulic passage 58a and is on the master cylinder 34 side of the first shut-off valve 60a. The first shut-off valve 60a corresponds to 'a shut-off valve' referred to in the present invention. The pressure sensor Pm corresponds to 'a hydraulic pressure detection section' referred to in the present invention.

Between the master cylinder 34 and the other connection port 20b, a second shut-off valve 60b of a solenoid valve of a normally open type is arranged on the upstream side with respect to the second hydraulic passage 58b. Further, a pressure sensor Pp is arranged on the downstream side with respect to the second hydraulic passage 58b. On the second hydraulic passage 58b, this pressure sensor Pp has a function to detect the hydraulic pressure on the downstream side of the second shut-off valve 60b, in other words, on the side of the wheel cylinders 32FR, 32RL, 32RR, and 32FL.

The normal openness of the first shut-off valve 60a and the second shut-off valve 60b refers to the type of a valve configured such that the normal position (the position of the valve body during demagnetization (when current is not applied)) is in a state of being at an open position (always open). Incidentally, in FIG. 2, the first shut-off valve 60a and the second shut-off valve 60b are shown in a state during magnetization (likewise for a later-described third shut-off valve 62).

At a point between the master cylinder 34 and the second shut-off valve 60b, the second hydraulic passage 58b is provided with a branched hydraulic passage 58c branching from the second hydraulic passage 58b. On the branched hydraulic passage 58c, serially connected are a third shut-off valve 62 of a solenoid valve of a normally close type and a first stroke simulator 64 (corresponding to 'a reaction force generation section' referred to in the present invention). The normal closing of the third shut-off valve 62 refers to the type of a valve configured such that the normal position (the position of the valve body during demagnetization (when current is not applied)) is in a state of being at a closed position (always closed).

Outline of the first stroke simulator 64 will be described below, referring to FIG. 2. Incidentally, the first stroke simulator 64 in FIG. 2 is shown such that the detailed structure thereof is briefly drawn.

As shown in FIG. 2, the first stroke simulator 64 is provided on the second hydraulic passage 58b and on the master cylinder 34 side of the second shut-off valve 60b. The first stroke simulator 64 is provided with a reaction-force hydraulic chamber 65 communicated with the branched hydraulic passage 58c. A hydraulic brake pressure generated in the second hydraulic chamber 56b of the master cylinder 34 is applied to the reaction-force hydraulic chamber 65.

Further, the first stroke simulator 64 is provided with a simulator piston 67, a first return spring 68a, and a second return spring 68b inside a housing 64a (see FIG. 3) thereof. The detailed inner structure of the first stroke simulator 64 will be described later in detail.

The configuration of the hydraulic passages is roughly categorized into a first hydraulic system 70a that connects the first hydraulic chamber 56a of the master cylinder 34 and the plurality of wheel cylinders 32FR and 32RL, and a second hydraulic system 70b that connects the second hydraulic chamber 56b of the master cylinder 34 and the plurality of wheel cylinders 32RR and 32FL.

The first hydraulic system 70a is configured by the first hydraulic passage 58a connecting the output port 54a of the master cylinder 34 (cylinder portion 38) of the hydraulic-pressure generation device 14 and the connection port 20a, the first and second piping tubes 22a and 22b connecting the connection port 20a of the hydraulic-pressure generation device 14 and the output port 24a of the motor cylinder device 16, the second and third piping tubes 22b and 22c connecting the output port 24a of the motor cylinder device 16 and the inlet port 26a of the VSA device 18, and the seventh and eighth piping tubes 22g and 22h connecting the first and second outlet ports 28a and 28b of the VSA device 18 and the respective wheel cylinders 32FR and 32RL.

The second hydraulic system 70b includes the second hydraulic passage 58b connecting the output port 54b of the master cylinder 34 (cylinder portion 38) of the hydraulic-pressure generation device 14 and the other connection port 20b, the fourth and fifth piping tubes 22d and 22e connecting the other connection port 20b of the hydraulic-pressure generation device 14 and the output port 24b of the motor cylinder device 16, the fifth and sixth piping tubes 22e and 22f connecting the output port 24b of the motor cylinder device 16 and the inlet port 26b of the VSA device 18, and the ninth and tenth piping tubes 22i and 22j for connecting the third and fourth outlet ports 28c and 28d of the VSA device 18 and the respective wheel cylinders 32RR and 32FL.

The motor cylinder device 16 is an electric brake device that drives a first slave piston 88a and a second slave piston 88b along the axial direction by the driving force of an electric motor 72 and thereby generates a hydraulic brake pressure.

Incidentally, regarding the movement directions of the first slave piston 88a and the second slave piston 88b at the time when a hydraulic brake pressure is generated (increased) by the motor cylinder device 16, the direction toward the first slave piston 88a is represented by direction X1 (forward direction) shown in FIG. 2, and the opposite direction toward the second slave piston 88b is represented by direction X2 (backward) shown in FIG. 2.

The motor cylinder device 16 includes a cylinder portion 76 incorporating the first slave piston 88a and the second slave piston 88b, the electric motor 72 for driving the first slave piston 88a and the second slave piston 88b, and a driving force transmission section 73 for transmitting the driving force of the electric motor 72 to the first slave piston 88a and the second slave piston 88b.

The driving force transmission section 73 has a driving force transmission mechanism 74 that includes a gear mechanism (deceleration mechanism) 78 for transmitting the rotational driving force of the electric motor 72, and a ball-screw structure 80 for converting this rotational driving force into a driving force in a linear direction along the axial direction of a ball-screw shaft (screw) 80a.

The cylinder portion 76 has a cylinder main body 82 substantially in a cylindrical shape and a second reservoir 84 attached to the cylinder main body 82. The second reservoir 84 is connected by a piping tube 86 with the first reservoir 36 attached to the master cylinder 34 of the hydraulic-pressure generation device 14, wherein brake fluid stored in the first reservoir 36 is supplied into the second reservoir 84 through the piping tube 86.

Inside the cylinder main body 82, the first slave piston 88a and the second slave piston 88b are arranged slidably along the axial direction of the cylinder main body 82 with a certain distance therebetween. The first slave piston 88a is disposed adjacent to the ball-screw structure 80 side, and moves, in contact with the front end of the ball screw shaft 80a, along the direction arrow X1 or X2 integrally with the ball screw shaft 80a. The second slave piston 88b is disposed farther than the first slave piston 88a from the ball screw assembly 80 side.

Inside the cylinder main body 82, an annular 230 is provided facing the outer circumferential surface of the first slave piston 88a. The guide piston 230 has a function to seal the gap between the outer circumferential surface of the first slave piston 88a and the driving force transmission mechanism 74 in a liquid tight sealing state, and a function to movably guide the first slave piston 88a along the axial direction of the first slave piston 88a. A slave piston packing 90c is attached to the inner circumferential surface of the guide piston 230. Further, a slave piston packing 90b is attached through an annular stepped portion to the outer circumferential surface, on the front end side, of the first slave piston 88a. A first back chamber 94a is formed between the slave piston packing 90c and the slave piston packing 90b, communicating with a later-described reservoir port 92a. A first return spring 96a is provided between the first slave piston 88a and the second slave piston 88b.

On the other hand, paired slave piston packings 90a, 90b are respectively attached through an annular stepped portion to the outer circumferential surface of the second slave piston 88b. A second back chamber 94b is formed between the paired slave piston packings 90a and 90b, communicating with a later-described reservoir port 92b. A second return spring 96b is provided between the second slave piston 88b and the front end portion of the cylinder main body 82.

The cylinder main body 82 of the cylinder portion 76 is provided with the two reservoir ports 92a, 92b and the two output ports 24a and 24b. The reservoir ports 92a, 92b are communicated with a reservoir chamber inside the second reservoir 84.

Further, inside the cylinder main body 82, there are provided a first hydraulic brake pressure chamber 98a for generating a hydraulic brake pressure that is output from the output port 24a to the wheel cylinders 32FR, 32RL side, and a second hydraulic brake chamber 98b for generating a hydraulic brake pressure that is output from the other output port 24b to the wheel cylinders 32RR, 32FL side.

Restricting means 100 is provided between the first slave piston 88a and the second slave piston 88b to restrict the maximum distance and the minimum distance between these 88a, 88b. Further, the second slave piston 88b is provided with a stopper pin 102 to restrict the sliding range of the second slave piston 88b and prevent over return of the second slave piston 88b to the first slave piston 88a side. Thus, for example, during backup by braking with a hydraulic brake pressure generated by the master cylinder 34, even when a defect has occurred in a system, other systems are not affected by the defect.

As the VSA device 18, a device with known configuration can be adopted, as appropriate. Concretely, as the VSA device 18, for example, a device can be used that includes a first brake system 110a for control of the first hydraulic system 70a connected to the disk brake mechanisms 30a and 30b (wheel cylinders 32FR and 32RL) for the right-side front wheel and the left-side rear wheel, and a second brake system 110b for control of the second hydraulic system 70b connected to the disk brake mechanisms 30c and 30d (wheel cylinders 32RR and 32FL) for the right-side rear wheel and the left-side front wheel.

Instead of the above-described configuration, the first brake system 110a may be configured by a hydraulic system connected to disk brake mechanisms arranged at the left-side front wheel and the right-side front wheel, and the second brake system 110b may be configured by a hydraulic system connected to disk brake mechanisms arranged at the left-side rear wheel and the right-side rear wheel. Further, the first brake system 110a may be configured by a hydraulic system connected to disk brake mechanisms arranged at the right-side front wheel and the right-side rear wheel on one side of the vehicle body, and the second brake system 110b may be configured by a hydraulic system connected to disk brake mechanisms arranged at the left-side front wheel and the left-side rear wheel on the other one side of the vehicle body.

As the first brake system 110a and the second brake system 110b have the same structure, the same reference symbols are assigned to elements corresponding to each other between the first brake system 110a and the second brake system 110b. In the following, the first brake system 110a will be mainly described while describing the second brake system 110b with bracketed notes, as appropriate.

The first brake system 110a (the second brake system 110b) has a first shared hydraulic passage 112 and a second shared hydraulic passage 114 shared by the wheel cylinders 32FR and 32RL (32RR and 32FL). The VSA device 18 includes a regulator valve 116, which is a normal-open type solenoid valve disposed between the inlet port 26a and the first shared hydraulic passage 112, a first check valve 118 that is arranged in parallel with the regulator valve 116 to allow the brake fluid to flow from the inlet port 26a side to the first shared hydraulic passage 112 side (while inhibiting the brake fluid from flowing from the first shared hydraulic passage 112 side to the inlet port 26a side), and a first invalve 120, which is a normally open type solenoid valve disposed between the first shared hydraulic passage 112 and the first outlet port 28a. Further, the VSA device 18 includes a second check valve 122 that allows the brake fluid to flow from the first outlet port 28a side to the first shared hydraulic passage 112 side (while inhibiting the brake fluid from flowing from the first shared hydraulic passage 112 side to the first outlet port 28a side), the second check valve 122 being arranged parallel with the first invalve 120, a second invalve 124, which is a normally open type solenoid valve disposed between the first shared hydraulic passage 112 and the second outlet port 28b, and a third check valve 126 that allows the brake fluid to flow from the second outlet port 28b side to the first shared hydraulic passage 112 side (while inhibiting the brake fluid from flowing from the first shared hydraulic passage 112 side to the second outlet port 28b side), the third check valve 126 being arranged parallel to the second invalve 124.

Still further, the VSA device 18 includes a first outvalve 128, which is a normally closed type solenoid valve disposed between the first outlet port 28a and the second shared hydraulic passage 114, a second outvalve 130, which is a normally closed type solenoid valve disposed between the second outlet port 28b and the second shared hydraulic passage 114, a reservoir 132 connected to the second shared hydraulic passage 114, a fourth check valve 134 that is disposed between the first shared hydraulic passage 112 and the second shared hydraulic passage 114 to allow the brake fluid to flow from the second shared hydraulic passage 114 side to the first shared hydraulic passage 112 side (while inhibiting the brake fluid from flowing from the first shared hydraulic passage 112 side to the second shared hydraulic passage 114 side), a pump 136 that is disposed between the fourth check valve 134 and the first shared hydraulic passage 112 to supply the brake fluid from the second shared hydraulic passage 114 side to the first shared hydraulic passage 112 side, a suction valve 138 and a discharge valve 140 provided before and after the pump 136, a motor M for driving the pump 136, and a suction valve 142, which is a normally closed type solenoid valve disposed between the second shared hydraulic passage 114 and the inlet port 26a.

Incidentally, the first out valve 128 and the second outvalve 130 correspond to 'a pressure reducing valve' referred to in the present invention.

In the first brake system 110a, a pressure sensor Ph is provided on the hydraulic passage adjacent to the inlet port 26a to detect the hydraulic brake pressure having been generated in the first hydraulic chamber 98a of the motor cylinder device 16 and output from the output port 24a of the motor cylinder device 1. Detection signals detected by the respective pressure sensors Pm, Pp, and Ph are introduced to a control section, not shown.

[Operation of Vehicular Brake System 10]

In the following, the operation of the vehicular brake system 10 will be described.

During normal operation when the vehicle brake system 10 normally operates, no matter whether or not a hydraulic brake pressure has been generated in the master cylinder 34, the first shut-off valve 60a and the second shut-off valve 60b, which are normally open type solenoid valves, turn into a valve close state by being magnetically excited, and the third shut-off valve 62, which is a normally closed type solenoid valve, turns into a valve open state by being magnetically excited (see FIG. 2). Accordingly, as the first hydraulic system 70a and the second hydraulic system 70b are shut off by the first shut-off valve 60a and the second shut-off valve 60b, it does not occur that a hydraulic brake pressure generated by the master cylinder 34 of the hydraulic-pressure generation device 14 is transferred to the wheel cylinders 32FR, 32RL, 32RR, and 32FL of the disk brake mechanisms 30a-30d. This is because a later-described electric brake system with the motor cylinder device 16 actually works during normal operation of the vehicular brake system 10.

In this situation, when a hydraulic brake pressure is generated in the second hydraulic chamber 56b of the master cylinder 34, the generated hydraulic brake pressure is transferred through the branched hydraulic passage 58c and the third shut-off valve 62, which is in the valve open state, to the reaction-force hydraulic chamber 65 of the first stroke simulator 64. The hydraulic brake pressure supplied to the hydraulic chamber 65 displaces the simulator piston 67 against the spring forces of the springs 68a and 68b, and a stroke of the brake pedal 12 is thereby allowed and a pseudo petal reaction force is generated to be fed back to the brake pedal 12. As a result, a brake feeling without a strange feeling for a driver can be obtained.

In such a system state, when the control section, not shown, has detected pedaling of the brake pedal 12 by the driver, the control section drives the electric motor 72 of the motor cylinder device 16 and transmits the driving force of the electric motor 72 through the driving force transmission mechanism 74 to displace the first slave piston 88a and the second slave piston 88b toward the direction arrow X2 in FIG. 2 against the spring forces of the first return spring 96a and the second return spring 96b. By the displacements of the first slave piston 88a and the second slave piston 88b, the hydraulic brake pressures inside the first hydraulic chamber 98a and the second hydraulic chamber 98b are increased, balancing with each other, and a desired hydraulic brake pressure is thus generated.

These hydraulic brake pressures in the first hydraulic chamber 98a and the second hydraulic chamber 98b of the motor cylinder device 16 are transferred through the first invalve 120 and the second invalve 124 of the VSA device 18 which are in the valve open state, to the wheel cylinders 32FR, 32RL, 32RR, and 32FL of the disk brake mechanisms 30a-30d. By operation of the wheel cylinders 32FR, 32RL, 32RR, and 32FL, desired braking forces are applied to the respective wheels.

In other words, by the vehicle brake system 10, during a normal operation state of the motor cylinder device 16 and the control section such as the ECU and the like not shown with by-wire control, when the driver pedals the brake pedal 12, a so-called brake-by-wire brake system becomes active. Concretely, in the vehicular brake system 10 during normal operation, if the driver pedals the brake pedal 12, then in a state that communication between the master cylinder 34 and the disk brake mechanisms 30a-30d (wheel cylinders 32FR, 32RL, 32RR, an 32FL) that brake the respective wheels is shut off by the first shut-off valve 60a and the second shut-off valve 60b, the disk brake mechanisms 30a-30d are operated by the hydraulic brake pressure generated by the motor cylinder device 16. Accordingly, the vehicular brake system 10 can be appropriately applied to a vehicle, for example, an electric vehicle (including a fuel cell electric vehicle), a hybrid vehicle, or the like, in which generation of a negative pressure by an internal combustion engine is little or does not exist, or can be applied to a vehicle without an internal combustion engine itself.

On the other hand, in the vehicular brake system 10, in an abnormal state in which the motor cylinder device 16 or the control section does not work, if the driver pedals the brake pedal 12, then a so-called conventional hydraulic brake system becomes active. Concretely, in the vehicular brake system 10 during abnormal state, if the driver pedals the brake pedal 12, then the first shut-off valve 60a and the second shut-off valve 60b are respectively made to be in a valve open state, and the third shut-off valve 62 is made to be in a valve closed state, so that a hydraulic brake pressure generated by the master cylinder 34 is transferred to the disk brake mechanisms 30a-30d (wheel cylinders 32FR, 32RL, 32RR, 32FL) to operate the disk brake mechanisms 30a-30d (wheel cylinders 32FR, 32RL, 32RR, 32FL).

[Detailed Structure of Vehicular Hydraulic-Pressure Generation Device 14 according to First Embodiment of the Invention]

Figure 3:
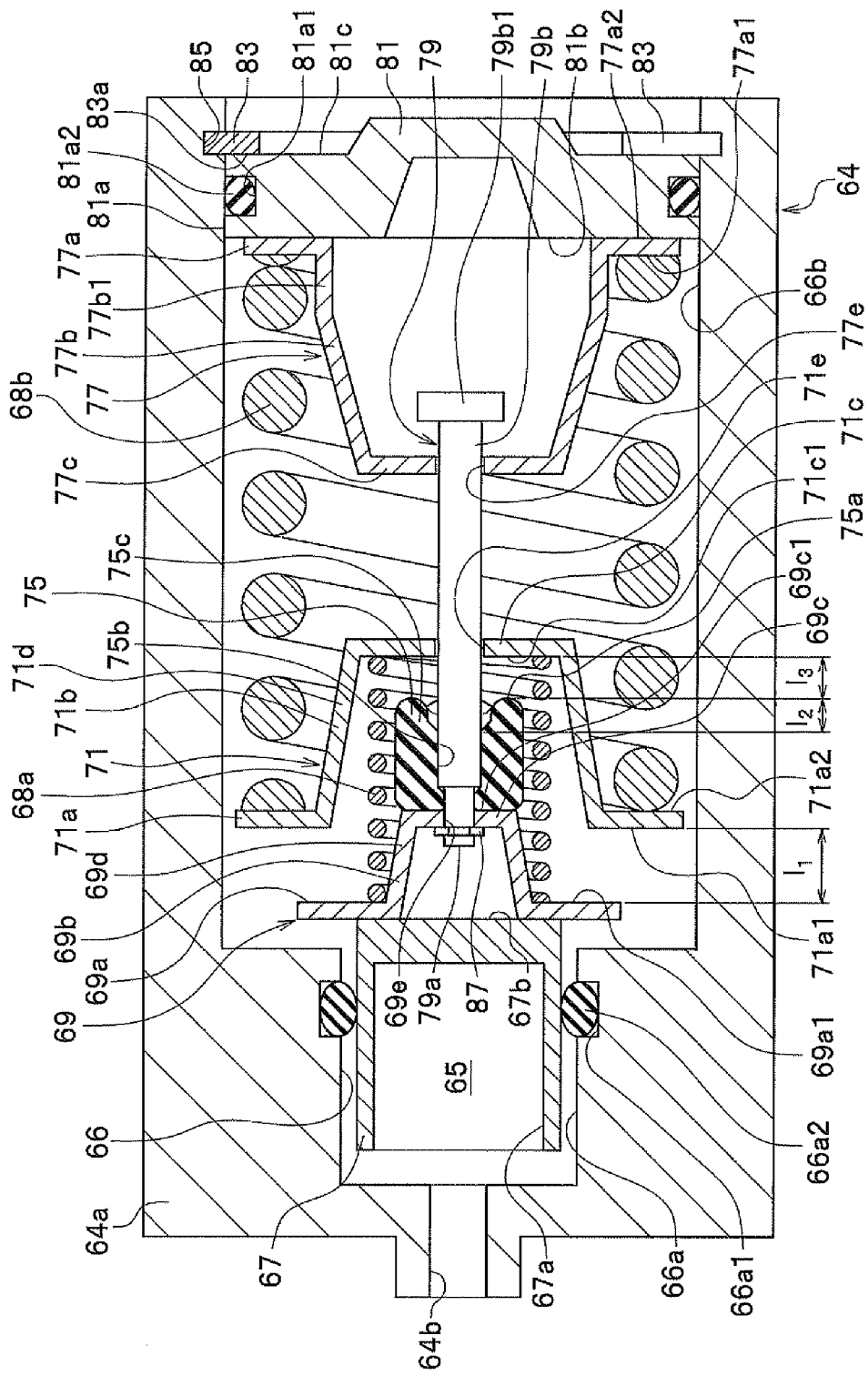
FIG. 3 is a vertical cross-sectional view of a first stroke simulator.
Figure 4A:
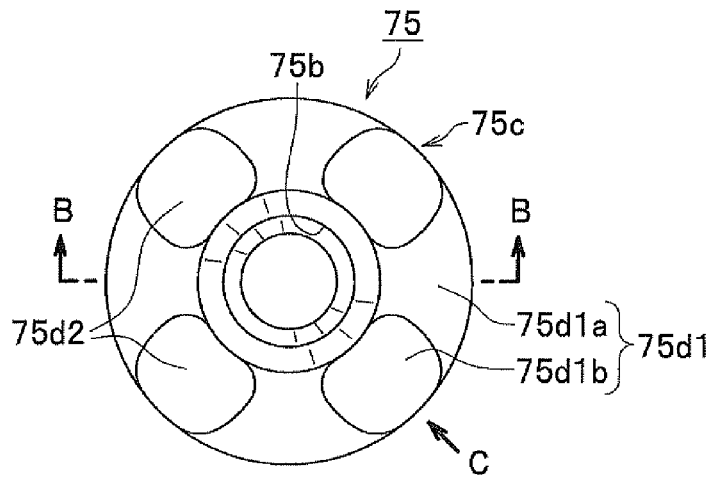
FIG. 4A is a plan view of a first bush fitted inside the first stroke simulator.
Figure 4B:
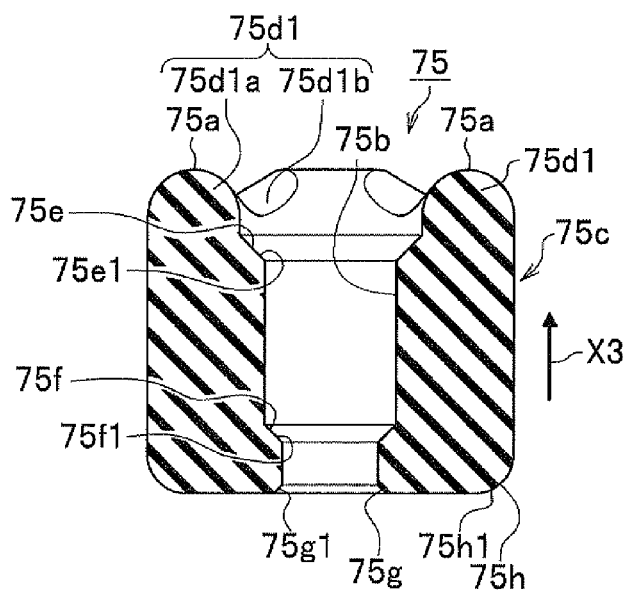
FIG. 4B is a cross-sectional view of the first bush in a view along the arrow direction represented by line B-B in FIG. 4A.
Figure 4C:
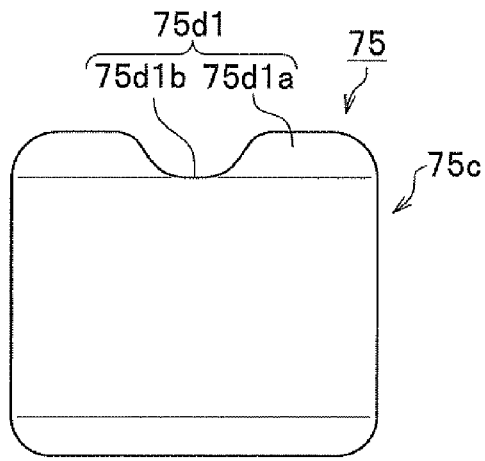
FIG. 4C is an appearance view of the first bush in a view from direction C in FIG. 4A.
Figure 5:
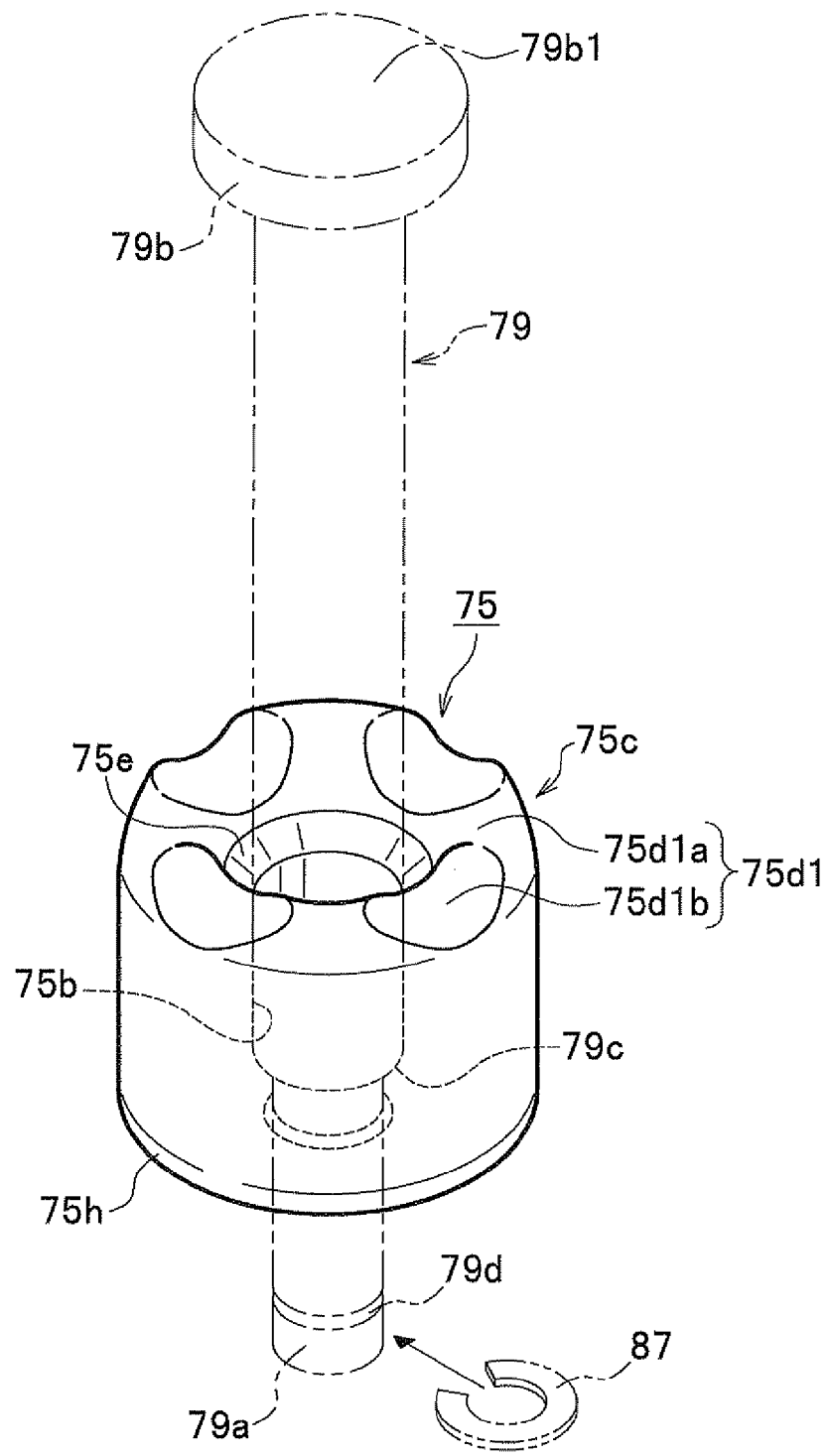
FIG. 5 is an exploded perspective view illustrating a state of fitting the first bush.

In the following, the first stroke simulator 64 (corresponding to 'a reaction force generation section' referred to in the present invention) having features in the hydraulic-pressure generation device 14 according to a first embodiment of the present invention will be described below, referring to FIGS. 3 to 5. FIG. 3 is a vertical cross-sectional view of the first stroke simulator. FIG. 4 is an illustration of the first bush fitted inside the first stroke simulator wherein FIG. 4A is a plan view of the first bush fitted inside the first stroke simulator, FIG. 4B is a cross-sectional view of the first bush in a view along the arrow direction represented by line B-B in FIG. 4A, and FIG. 4C is an appearance view of the first bush in a view from direction C in FIG. 4A. FIG. 5 is an exploded perspective view illustrating a state of fitting of the periphery of the first bush.

The first stroke simulator 64 provided in the hydraulic-pressure generation device 14 according to the first embodiment of the present invention includes, as shown in FIG. 3, a fluid introduction port 64b, a cylinder portion 66 in which the partitioned reaction-force hydraulic chamber 65 substantially in a cylindrical shape is formed by partitioning, the simulator piston 67 movable forward and backward in the cylinder portion 66, the first return spring (corresponding to 'elastic portion' and 'first elastic portion') 68a in a coil form having a first elastic modulus k1, and the second return spring (corresponding to 'elastic portion' and 'second elastic portion') 68b in a coil form having a second elastic modulus k2 that is larger than the first elastic modulus k1. In case that the valve body of the third shut-off valve (normally closed) 62 is switched to the open position, the brake fluid is introduced to enter or exit the reaction-force hydraulic chamber 65 through the fluid introduction port 64b, the reaction-force hydraulic chamber 65 communicating with the second hydraulic chamber 56b (see FIG. 2) through the fluid introduction port 64b and the branched hydraulic passage 58c.

The cylinder portion 66 is formed by providing a first cylinder 66a arranged on the backward direction (leftward in FIG. 3, which will hereinafter be defined as 'backward') side of the simulator piston 67 and a second cylinder 66b arranged on the forward direction (rightward in FIG. 3, which will hereinafter be defined as 'forward') side of the simulator piston 67, wherein the first cylinder 66a and the second cylinder 66b are made coaxially serial. The inner diameter of the circumferential shape of the first cylinder 66a is formed smaller than the inner diameter of the circumferential shape of the second cylinder 66b.

The inner wall of the first cylinder 66a is provided with an annular groove 66a1 on the front side thereof. A seal ring 66a2, of silicon rubber for example, is fitted to the annular groove 66a1. Thus attained liquid tight contact by the seal ring 66a2 prevents the brake fluid, which has been charged in the reaction-force hydraulic chamber 65, from leaking to the front side of the seal ring 66a2.

The simulator piston 67 is provided with a hollow portion 67a substantially in a cylindrical shape that is open toward the rear side thereof (backward). This hollow portion 67a has a function to increase the accumulated amount of the brake fluid by increasing the capacity of the reaction-force hydraulic chamber 65. A first spring seat member 69 is firmly attached to the front end wall 67b of the simulator piston 67 by appropriate bonding means such as welding or the like.

The vertical cross-section of the first spring seat member 69 is formed substantially in a hat shape. The first spring seat member 69 is provided with a flange portion 69a in a circular disk shape whose central portion is hollowed, a circumferential wall portion 69b extending forward from the inner circumferential portion of the flange portion 69a, and a top wall portion 69c covering the top portion of the circumferential wall portion 69b. The circumferential wall portion 69b is formed in a shape thinning toward the end thereof such that the outer diameter thereof becomes gradually smaller from the inner circumferential portion of the flange portion 69a toward the top wall portion 69c. The front end wall 69a1 of the flange portion 69a of the first spring seat member 69 has a function to receive and stop the rear end side of the first return spring 68a.

On the front side facing the first spring seat member 69, similarly to the first spring seat member 69, a second spring seat member 71 with a cross-section substantially in a hat shape is formed. The second spring seat member 71 includes a flange portion 71a in a circular disk shape whose central portion is hollowed, a circumferential wall portion 71b in a cylindrical shape extending forward from the inner circumferential portion of the flange portion 71a, and a top wall portion 71c that covers the top portion of the circumferential wall portion 71b. The circumferential wall portion 71b is formed in a shape thinning toward end thereof such that the outer diameter thereof becomes gradually smaller from the inner circumferential portion of the flange portion 71a toward the top wall portion 71c. The front end side 71a2 of the flange portion 71a of the second spring seat member 71 has a function to receive and stop the rear end side of the second return spring 68b.

The size of the second spring seat member 71 is formed larger as a whole, compared with the size of the first spring seat member 69. Concretely, the outer diameter size of the hat portion 69d formed by the circumferential wall portion 69b and the top wall portion 69c of the first spring seat member 69 is formed sufficiently larger than the inner diameter size of the hat portion 71d formed by the circumferential wall portion 71b and the top wall portion 71c of the second spring seat member 71. The rear end wall 71c1 of the top wall portion 71c of the second spring seat member 71 has a function to receive and stop the front end side of the first return spring 68a.

On the front end wall 69c1 of the top wall portion 69c of the first spring seat member 69, a first bush 75 corresponding to 'elastic portion' and 'third elastic portion' is provided such as to be housed inside the first return spring 68a. It is thereby possible to effectively use a limited space resource and provide the first bush 75 in parallel to the first return spring 68a.

Herein, a first section I1 is set between the front end wall 69a1 of the flange portion 69a of the first spring seat member 69 and the rear end wall 71a1 of the flange portion 71a of the second spring seat member 71. On the other hand, a third section 13 is set between the front side top portion 75a of the first bush 75 and the rear end wall 71c1 of the top wall portion 71c of the second spring seat member 71. The first section I1 is set larger than the third section 13. By this arrangement, in a second section I2, which is obtained by subtracting the third section 13 from the first section I1, in addition to the compressive deformation of the first return spring 68a, the first bush 75 is squashed and compressively deformed. Assuming that the first to third sections are set in such a manner, the first bush 75 has an important function to create reaction force characteristic against the operation amount of the brake pedal 12, making the reaction force characteristic be non-linear. Incidentally, the detailed configuration and the action of the periphery of the first bush 75 will be described later.

On the front side facing the second spring seat member 71, similarly to the first and second spring seat member 69, 71, a third spring seat member 77 with a cross-section substantially in a hat shape is formed. The third spring seat member 77 includes a flange portion 77a in a circular disk shape whose central portion is hollowed, a circumferential wall portion 77b in a cylindrical shape extending backward from the inner circumferential portion of the flange portion 77a, and a top wall portion 77c that covers the top portion of the circumferential wall portion 77b. The circumferential wall portion 77b is formed in a shape thinning toward the end thereof such that the diameter thereof becomes gradually smaller, with exception at a base portion 77b1 thereof, from the inner circumferential portion of the flange portion 77a toward the top wall portion 77c. The rear end side 77a1 of the flange portion 77a of the third spring seat member 77 has a function to receive and stop the front end side of the second return spring 68b.

Penetration holes 69e, 71e, 77e are provided at the central portions of the respective top wall portions 69c, 71c, 77c of the first to third spring seat members 69, 71, 77. The first bush 75 is formed virtually by a cylindrical main body portion 75c having a hollow portion 75b substantially in a cylindrical shape. A first rod member 79 is provided, wherein the first rod member 79 has an outer diameter slightly smaller than the inner diameters of the penetration holes 69e, 71e, 77e and the hollow portion 75b of the first bush 75 so that the first rod member 79 penetrates through the penetration holes 69e, 71e, 77e and the hollow portion 75b of the first bush 75. The rear end side 79a of the first rod member 79 is stopped by a later-described engaging stop member 87 on the rear end side of the top wall portion 69c of the first spring seat member 69. An expanding portion 79b1 is formed on the front end side 79b of the first rod member 79, the thick portion 79b1 having a diameter larger than the diameter of the penetration hole 77e provided through the top wall portion 77c of the third spring seat member 77. Thus, the joining relationship between the front end side 79b of the first rod member 79 and the penetration hole 77e provided through the top wall portion 77c of the third spring seat member 77 is prevented from being easily lost.

In order to fix the third spring seat member 77, a lid portion 81, which is for example made of metal with a substantially circular disk shape, is provided on the front end side of the housing 64a of the first stroke simulator 64. The lid portion 81 is provided with an annular groove portion 81a1 on the outer circumferential wall 81a thereof. A seal ring 81a2, which is for example made of a silicon rubber, is fitted to the annular groove portion 81a1. Thus, gastight sealing by the seal ring 81a2 prevents fluid such as air, brake fluid, and the like, which fills the inside of the second cylinder 66b, from leaking to the front side of the seal ring 81a2.

The rear end side 81b of the lid portion 81 is fixed and attached to the front end side 77a2 of the flange portion 77a of the third spring seat member 77. The front-end-side circumferential side portion 81c of the lid portion 81 is in contact with and supported by the rear-portion circumferential-sidewall of a stop ring 83 formed in a disk shape having an opening at the central portion. The stop ring 83 is provided such as to engage with an annular groove 85 recessed and formed on the inner wall of the second cylinder 66b. Thus, the front end side of the second return spring 68b is surely fixed to the housing 64a of the first stroke simulator 64.

In brief, the front end side of the second return spring 68b is in contact with and supported by the housing 64a of the first stroke simulator 64, and on the other hand, the rear end side of the second return spring 68b is supported by the flange portion 71a of the second spring seat member 71. The front end side of the first return spring 68a is in contact with and supported by the front-end-side top wall portion 71c1 of the second spring seat member 71, and on the other hand, the rear end side of the first return spring 68a is in contact with and supported by the flange portion 69a of the first spring seat member 69. The first spring seat member 69 is fixed and attached to the front end wall 67b of the simulator piston 67. As a result, the simulator piston 67 is urged toward the rear side (backward) by the first and second return springs 68a, 68b.

The first and second return springs 68a, 68b are serially disposed to be mutually dynamically. The first and second elastic moduli k1, k2 make the increasing gradient of the pedal reaction force low in the early stage of pedaling of the brake pedal 12, and makes the pedal reaction force high in the later stage of pedaling. This is based on a design concept aimed at concentration of the driver on driving, without making the driver be conscious whether a conventional brake system or a by-wire brake system is mounted, by making the reaction force characteristic against the stroke amount of the brake pedal 12 equal to that of a conventional brake system.

In the following, the peripheral structure of the first bush 75 will be described, referring to FIGS. 4 and 5. The first bush 75, which has an extremely important role of creating the reaction force characteristic against the operation amount of the brake pedal 12 such that the reaction force characteristic is non-linear, is formed virtually by the cylindrical main body portion 75c having the hollow portion 75b substantially in a cylindrical shape, as shown in FIGS. 4(a) to (c). The first bush 75 is formed, for example, by an elastic body of a synthetic resin. The first bush 75 has a third elastic modulus k3 (Herein, k3 is a variable value.) that is smaller than the second elastic modulus k2. The first bush 75 is arranged in parallel dynamically to the first return spring 68a.

Herein, the reason for setting the third elastic modulus k3 to a value in a range smaller than the second elastic modulus k2 is that if the third elastic modulus k3 were set to a value in a range larger than the second elastic modulus k2, it would not occur that the first bush 75 with the third elastic modulus k3 works such as to create reaction force non-linear characteristic, due to the dynamic relationship between the second return spring 68b and the first bush 75.

Incidentally, the third elastic modulus k3 may be set to a value in a range smaller than the first elastic modulus k1. The first bush 75 is provided for the purpose of reducing a feeling of strangeness related to the characteristic of the reaction force against the operation amount of the brake pedal 12. In attaining this purpose, there is a case that creation of reaction force non-linear characteristic by the first bush 75 is sufficient even if the creation is a little.

On one side (corresponding to 'the side opposite to the simulator piston') along the axial direction of the first bush 75, a first easily-deformable portion 75d1 is integrally formed. The first easily-deformable portion 75d1 is formed by alternately providing convex portions 75d1a and concave portions 75d1b at mutually equal interval. Each convex portion 75d1a is formed such that the cross-sectional area of the convex portion 75d1a itself, the cross-sectional area being perpendicular to the direction of compressive deformation, gradually decreases along the compressive deformation direction (direction X3 represented by the arrow in FIG. 4B). In contrast, each concave portion 75d1b is formed such that the spatial cross-sectional area formed by the concave portion 75d1b, the spatial cross-sectional area being perpendicular to the direction of compressive deformation, gradually increases along the compressive deformation direction (direction X3).

In brief, the first easily-deformable portion 75d1 is formed such that the cross-sectional area in the direction perpendicular to the direction of compressive deformation gradually decreases or gradually increases along the direction of the compressive deformation. Thus, the first easily-deformable portion 75d1 of the first bush 75 acts such that, accompanying the development of compressive deformation, squashing of the first easily-deformable portion 75d1 develops in the order of portion with a smaller cross-sectional area (in other words, a portion with a smaller elastic modulus) with respect to the direction perpendicular to the direction of compressive deformation. This compressive deformation of the first bush 75 creates a reaction force corresponding to the force of the compressive deformation. This means that the first bush 75 creates reaction force non-linear characteristic.

Further, in the process of the development of this squashing, the first easily-deformable portion 75d1 of the first bush 75 acts such as to increase the friction force between the inner circumferential wall of the hollow portion 75b of the first bush 75 and the outer circumferential wall of the first rod member 79. The increase in the friction force is based on phenomena including restriction of the expansion of the outer circumferential wall of the first bush 75 by the inner diameter of the first return spring 68a. This increase in the friction force functions to improve the non-linearity of the reaction force characteristic created by the first bush 75.

On the hollow portion 75b of the first bush 75, an annular stepped portion 75e and an annular receiving portion 75f are provided with a certain distance therebetween along the direction (direction X3) of compressive deformation. The annular stepped portion 75e is formed by an inclined surface 75e1, which is annularly continuous along the inner circumferential side surface of the hollow portion 75b. The meaning of the existence of the annular stepped portion 75e is based on a function, as a second easily-deformable portion, to make the reaction force characteristic caused by application of a compressive deformation force to the first bush 75 be non-linear, and a function to guide the first rod member 79, in case of trying to make the first rod member 79 penetrate from the side, on which the first easily-deformable portion 75d1 is present, of the first bush 75 through the hollow portion 75b, so that the first rod member 79 is guided to the inside of the hollow portion 75b after the rear end side 79a of the first rod member 79 hits against the inclined surface 75e1. Accordingly, the annular stepped portion 75e enables smooth penetration of the first rod member 79 through the inside of the hollow portion 75b.

The annular receiving portion 75f, which is present at the hollow portion 75b of the first bush 75, is formed by an inclined surface 75f1 annularly continuous along the inner circumferential side surface of the hollow portion 75b. On the other hand, on the front side of the simulator piston, the first rod member 79 is provided with an annular stepped portion 79c at which the outer diameter becomes smaller is formed as shown in FIG. 5. An annular groove 79d in a circular form is provided on the outer circumferential side surface of the rear end side 79a of the first rod member 79. The annular groove 79d engagingly stops the engaging stop member 87, which is made for example of a C-shaped clip. The meaning of the existence of the annular receiving portion 75f is based on a function to surely transfer the reaction force non-linear characteristic created by the first bush 75 to the first rod member 79.

The meaning of the existence of the annular receiving portion 75f is further based on that, just in case that attaching the first bush 75 in a direction (upside down) opposite to a normal direction is attempted by mistake, as the annular stepped portion 79c of the first rod member 79 hits against a portion, other than the annular receiving portion 79c, of the first bush 75, penetration of the first rod member 79 through the hollow portion 75b is prevented in such a case. Accordingly, the annular receiving portion 75f makes it possible to surely transfer the non-linear characteristic, of a reaction force, created by the first bush 75 to the first rod member 79, and to prevent in advance attaching the first bush 75 in a direction opposite to the normal direction.

A first tapered portion 75g present at the hollow portion 75b of the first bush 75 is, as shown in FIG. 4B, formed by an annular inclined curved surface 75g1 along the inner circumferential side surface of the hollow portion 75b. On the other hand, a second tapered portion 75h present on the outer circumferential surface of the first bush 75 is, as shown in FIG. 4B, formed by an annular inclined curved surface 75h1 along the outer circumferential side surface of the first bush 75. The meaning of the existence of the first and second tapered portions 75g, 75h is based on a function, as a third easily-deformable portion, to make the reaction force characteristic be non-linear, the reaction force characteristic being created in case that a compressive deformation force is applied to the first bush 75.

In the following, the action of the first bush 75 will be described.

[Action of First Bush 75]

Figure 6:
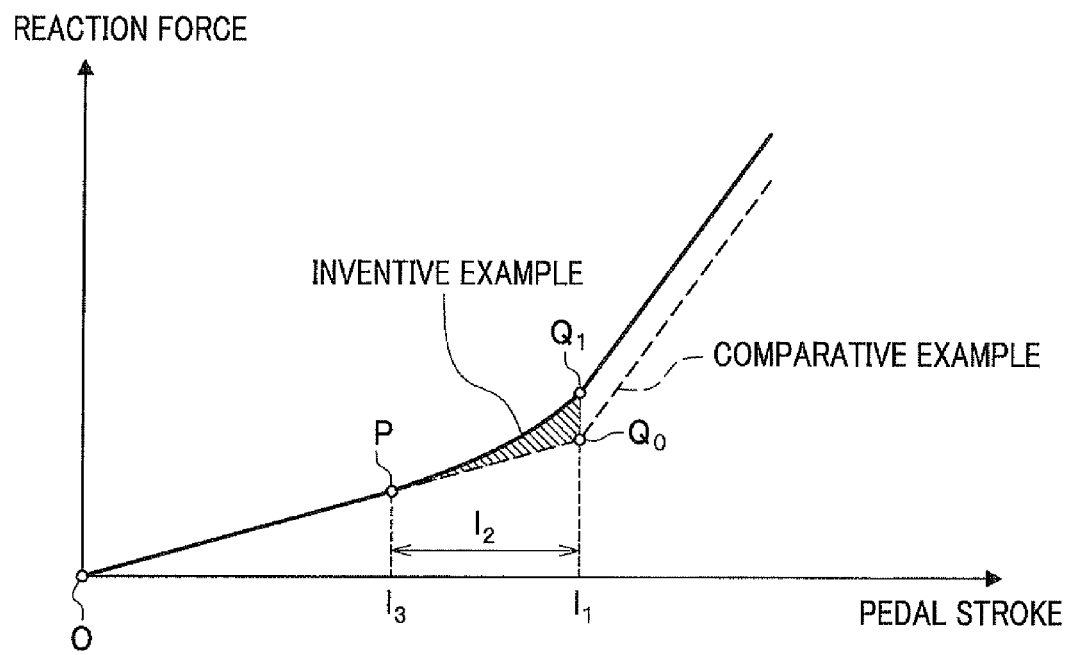
FIG. 6 is a diagram illustrating action in an embodiment in comparison with a comparative example.

FIG. 6 is a diagram illustrating the action of the first bush 75 in an embodiment.

First, when the brake pedal 12 is operated by the driver, a hydraulic brake pressure is generated, and this hydraulic brake pressure is transferred to the simulator piston 67 inside the cylinder portion 66. Then, the simulator piston 67 moves inside the cylinder portion 66. The movement of the simulator piston 67 primarily performs compressive deformation of the first return spring 68*a* having an elastic modulus smaller than that of the second return spring 68*b*. This section is the first section (see the section extending from Point O to point Q0 in FIG. 6) I1.

In other words, accompanying the movement of the simulator piston 67 in the forward direction, as the first spring seat member 69 moves forward, the front end wall 69*a*1 of the flange portion 69*a* of the first spring seat member 69 finally hits against the rear end wall 71*a*1 of the flange portion 71*a* of the second spring seat member 71. In brief, the time from when the first spring seat member 69 starts forward movement until when the first spring seat member 69 hits against the second spring seat member 71 corresponds to the first section I1.

The first section I1 can be divided into the second section I2 and the third section I3. The second section I2 refers to a section after the front side top portion 75*a* of the first bush 75 has hit against the rear end wall 71*c*1 of the top wall portion 71*c* of the second spring seat member 71, accompanying the movement of the simulator piston 67 in the forward direction. On the other hand, the third section I3 refers to a section from when the first spring seat member 69 starts moving forward, accompanying the movement of the simulator piston 67 in the forward direction, until a time immediately before the front side top portion 75*a* of the first bush 75 hits against the rear end wall 71*c*1 of the top wall portion 71*c* of the second spring seat member 71.

In other words, on one hand, the second section I2 has a start point that is a certain point in the first section I1 (the time when the front side top portion 75*a* of the first bush 75 hits against the rear end wall 71*c*1 of the top wall portion 71*c* of the second spring seat member 71, accompanying the movement of the simulator piston 67 in the forward direction: see point P in FIG. 6), and on the other hand, the first section I1 and the second section I2 have a common end point that is the switching point, on the first section I1, of the reaction force linear characteristics (the point at which the reaction force linear characteristics respectively related to the first elastic modulus k1 and the second elastic modulus k2, which are different from each other, are switched therebetween, or the switching point where the compressive deformation of the second return spring 68*b* comes to be primarily performed; see point Q in FIG. 6). Accordingly, the compressive deformation of the first bush 75 is performed in parallel with the compressive deformation of the first return spring 68*a* in the second section I2 that extends from the certain point (see point P in FIG. 6) in the first section I1 to the above-described switching point (see point Q in FIG. 6).

In the second section I2, the reaction force characteristic against the operation amount of the brake pedal 12 is formed by the total of reaction force linear characteristic created by compressive deformation of the first return spring 68*a* and reaction force non-linear characteristic created by the compressive deformation of the first bush 75. Thus, the reaction force characteristic in the second section I2 (see the section from point P to point Q1 in FIG. 6) is adjusted such as to smoothly join the paired reaction force linear characteristics. As shown in FIG. 6, this adjustment is realized by adding, such as to stack, the reaction force non-linear characteristic, which is obtained by inserting the first bush 75 in parallel, to the reaction force linear characteristic created by the compressive deformation of the first return spring 68*a*.

Concretely, in the early stage of the compressive deformation of the first bush 75, squashing of the first to third easily-deformable portions 75*d*1, 75*e*, 75*h* develops in the order of portion with a smaller transverse cross-sectional area (in other words, portion with a smaller elastic modulus), wherein the transverse cross-sectional area expands with respect to the direction perpendicular to the direction of compressive deformation (Hereinafter, this transverse cross-sectional area will be referred to merely as 'transverse cross-sectional area'). In this case, stacking of reaction force characteristic by the compressive deformation of the first bush 75 on the reaction force linear characteristic created by the compressive deformation of the first return spring 68*a* is little. In contrast, from and after the middle stage of the compressive deformation of the first bush 75, it is unchanged that squashing of the first to third easily-deformable portions 75*d*1, 75*e*, 75*h* develops in the order of portion with a smaller transverse cross-sectional area, however, all the remaining portions of the first easily-deformable portion 75*d*1 are portions with a comparatively large transverse cross-sectional area. In this case, stacking of reaction force characteristic created by compressive deformation of the first bush 75 on the reaction force linear characteristic created by the compressive deformation of the first return spring 68*a* becomes larger as the compressive deformation of the first bush 75 develops.

Further, in the process in which the compressive deformation of the first bush 75 develops, the first easily-deformable portion 75*d*1 of the first bush 75 acts such as to increase the friction force between the inner circumferential wall and the outer circumferential wall of the rod member 79. An increase in this friction force is based on phenomena including restriction of the expansion of the outer circumferential wall of the first bush 75 by the inner diameter portion of the first return spring 68*a*. The increase in this friction force functions to improve the non-linearity of the reaction force characteristic created by the first bush 75.

Therefore, according to the aspect of the invention in the present first embodiment, regarding the reaction force characteristic against the operation amount of the brake pedal 12, it is possible to reduce a feeling of strangeness that would be caused, when the brake is operated, by a dogleg shape singularity (see point Q0 in FIG. 6) which would, if no solution was adopted, be generated at a switching point at which the reaction force linear characteristics which are respectively related to the first elastic modulus k1 and the second elastic modulus k2 being different from each other are switched therebetween.

[Operation and Advantages of Vehicular Hydraulic-Pressure Generation Device 14 According to First Embodiment]

In the following, the operation and the advantages of the hydraulic-pressure generation device 14, according to the first embodiment, provided with the first stroke simulator 64, will be described.

The vehicular hydraulic-pressure generation device 14 according to the first embodiment includes the master cylinder (hydraulic pressure generation section) 34 for generating a hydraulic pressure corresponding to the operation amount of the brake pedal (brake operating member) 12 by a driver, and the first stroke simulator (reaction force generation section) 64 that is communicated with the master cylinder (hydraulic pressure generation section) 34 to generate a reaction force corresponding to the operation amount of the brake pedal (brake operating member) 12.

The first stroke simulator (reaction force generation section) 64 includes the simulator piston 67 moved in the forward direction or the backward direction, corresponding to a hydraulic pressure generated by the master cylinder (hydraulic pressure generation section) 34, and the elastic portions 68a, 68b, 75 provided on the side in the forward direction of the simulator piston 67. The elastic portions 68a 68b, 75 are respectively the first return spring (the first elastic portion) 68a having the first elastic modulus k1, the second return spring (the second elastic portion) 68b having the second elastic modulus k2 larger than the first elastic modulus k1, and the first bush (the third elastic portion) 75 having the third elastic modulus k3 smaller than the second elastic modulus k2.

By the hydraulic-pressure generation device 14 according to the first embodiment, as the first bush (the third elastic portion) 75 having the third elastic modulus k3 smaller than the second elastic modulus k2 is provided, regarding the reaction force characteristic against the operation amount of the brake pedal 12, it is possible to reduce a feeling of strangeness, when the brake is operated, that would be caused by a dogleg shape singularity (see point Q0 in FIG. 6) which would, if no solution was adopted, be generated at a switching point at which the reaction force linear characteristics are switched therebetween, the reaction force linear characteristics being different from each other and respectively related to the first elastic modulus k1 and the second elastic modulus k2.

Further, in the hydraulic-pressure generation device 14, the first return spring (the first elastic portion) 68a and the second return spring (the second elastic portion) 68b are provided serially to each other, and the first bush (the third elastic portion) 75 is provided in parallel with the first return spring (the first elastic portion) 68a. The first bush (the third elastic portion) 75 is provided such that the magnitude of the contact area on the side of the backward direction of the simulator piston 67 is different from the magnitude of the contact area on the side of the forward direction of the simulator piston 67.

Herein, 'The first bush 75 is provided such that the magnitude of the contact area on the side of the backward direction of the simulator piston 67 is different from the magnitude of the contact area on the side of the forward direction of the simulator piston 67.' means making the magnitudes of the contact areas in contact with the neighboring members of the first bush 75 be different between the front side and the rear side. Concretely, as shown in FIG. 3, on the rear end side of the first bush 75, the front end wall 69c1 of the top wall portion 69c of the first spring seat member 69 corresponds to the neighboring member as a contact object. On the other hand, on the front end side (the front side top portion 75a) of the first bush 75, the rear end wall 71c1 of the top wall portion 71c of the second spring seat member 71 corresponds to the neighboring member as a contact member. In brief, in the example shown in FIG. 3, the contact area of the first bush 75, the contact area being on the side of the backward direction of the simulator piston 67, is set larger than the contact area of the first bush 75, the contact area being on the forward direction of the simulator piston 67.

In the vehicular hydraulic-pressure generation device 14 according to the first embodiment, when the driver operates the brake pedal, the master cylinder 34 generates a hydraulic pressure corresponding to the operation amount. The first stroke simulator 64 communicated to the master cylinder 34 generates a reaction force corresponding to the operation amount of the brake pedal 12 by collaboration between the simulator piston 67 and the elastic portions 68a, 68b, 75. That is, when the operation amount of the brake pedal 12 is small, compressive deformation of the first return spring having an elastic modulus smaller than the elastic modulus of the second return spring is primarily performed. On the other hand, when the operation amount of the brake pedal 12 is large, compressive deformation of the second return spring is primarily performed. When the operation amount of the brake pedal 12 is intermediate, compressive deformation of the first bush 75 is performed in parallel with compressive deformation of the first return spring.

Accordingly, in the vicinity range of the switching point (see point Q in FIG. 6) at which the reaction force linear characteristic related to the first elastic modulus k1 and the reaction force linear characteristic related to the second elastic modulus k2 are switched therebetween, the reaction force characteristic against the operation amount of the brake pedal 12 is formed by the total of reaction force characteristic created by compressive deformation of the first return spring (the first elastic portion) 68a and reaction force characteristic created by the compressive deformation of the first bush (the third elastic portion) 75. Thus, in the vicinity range of the switching point Q, the reaction force characteristic against the operation amount of the brake pedal 12 is adjusted such as to smoothly join the paired reaction force linear characteristics, as shown in FIG. 6.

Accordingly, by the hydraulic-pressure generation device 14 according to the first embodiment, regarding the reaction force characteristic against the operation amount of the brake pedal 12, it is possible to reduce a feeling of strangeness, when the brake is operated, that would be caused by a dogleg shape singularity (see point Q0 in FIG. 6) which would, if no solution was adopted, be generated at the switching point Q at which the reaction force linear characteristics related to the first elastic modulus k1 and the reaction force characteristic related to the second elastic modulus k2 being different from each other are switched therebetween.

Further, as the magnitude of the contact area of the first bush 75 on the simulator piston 67 backward direction side is set different from the magnitude of the contact area of the first bush 75 on the simulator piston 67 forward direction side, it is possible to prevent buckling of the first bush 75 itself on the side of the larger contact area, and make the reaction force characteristic against the brake pedal 12 on the side of the smaller contact area to be non-linear.

Still further, arrangement can be made such that the compressive deformation of the first bush (the third elastic portion) 75 is performed in the section that includes the switching point Q (see FIG. 6) at which the reaction force linear characteristics related to the first elastic modulus k1 and the second elastic modulus k2 being different from each other are switched therebetween.

Herein, 'the section including the switching point Q at which the linear reaction force characteristics, which are respectively related to the first elastic modulus k1 and the second elastic modulus k2 different from each other, are switched therebetween' refers to the section where a feeling of strangeness is caused at the time of braking operation. In brief, in the section where a feeling of strangeness is caused at the time of braking operation, the compressive deformation of the first bush (the third elastic portion) 75 is performed in parallel with the compressive deformation of the first return spring (the first elastic portion) 68a. Accordingly, by adopting the above-described arrangement, it is possible to appropriately reduce a feeling of strangeness at the time of braking operation.

Further, arrangement can be made as follows. That is, the compressive deformation of the first bush (the third elastic portion) 75 is performed in the second section I2 overlapping on the first section I1 where the compressive deformation of the first return spring (the first elastic portion) 68a is primarily performed. The first section I1 has the end point at the switching point (see point Q in FIG. 6), while the second section I2 has the start point at a certain point (see point P in FIG. 6) in the first section I1 and has the end point at the switching point Q as a common end point.

By this arrangement, in the second section I2 having the point P in the first section I1 as the start point and having the switching point Q as the end point, the compressive deformation of the first bush (the third elastic portion) 75 is performed in parallel with the compressive deformation of the first return spring (the first elastic portion) 68a.

Accordingly, in the second section I2, the reaction force characteristic against the operation amount of the brake pedal 12 is formed by the total of reaction force characteristic created by compressive deformation of the first return spring (the first elastic portion) 68a and reaction force characteristic created by the compressive deformation of the first bush (the third elastic portion) 75. Thus, in the second section I2, the reaction force characteristic against the operation amount of the brake pedal 12 is adjusted such as to smoothly join the paired reaction force linear characteristics. Accordingly, by adopting the above-arrangement, it is possible to appropriately reduce a feeling of strangeness at the time of braking operation.

Still further, arrangement can made such that the first bush 75 creates non-linear reaction force characteristic by having, as the third elastic modulus k3, a variable value that gradually increases with the development of the compressive deformation of the (the third elastic portion) 75. By such an arrangement, as the first bush 75 creates reaction force non-linear characteristic, it is possible to smoothly join the paired reaction force linear characteristics into reaction force non-linear characteristic in the range at the above-described switching point Q.

Yet further, as the first and second elastic portions are formed respectively by the first and second return springs 68a, 68b, and the third elastic portion is formed by the first bush 75 of an elastic body such as a synthetic resin or the like, the first stroke simulator 64 with a high reduction effect on a feeling of strangeness at the time of braking operation can be realized by a simple structure.

Further, arrangement can be made as follows. That is, the first bush (the third elastic portion) 75 is substantially in a cylindrical shape; is housed inside the first return spring 68a; and is provided, at at least either end portion along the axial direction of the substantially cylindrical shape, with the first to third first easily-deformable portions 75d1, 75e, 75g, 75h. Herein, these first to third first easily-deformable portions 75d1, 75e, 75g, and 75h are formed such that the each cross-sectional area perpendicular to the direction of compressive deformation gradually increases or decreases along the direction of compressive deformation, and reaction force non-linear characteristic of the first bush (the third elastic portion) 75 is thereby created. By this arrangement, the first bush (the third elastic portion) 75 acts such as to create reaction force non-linear characteristic. Thus, it is possible to realize a first stroke simulator 64 having an appropriate reaction force characteristic with a simple structure.

Still further, the first and second first easily-deformable portions 75d1, 75e can be arranged on the side, of the first bush (the third elastic portion) 75, opposite to the simulator piston 67. By this arrangement, when compressive deformation of the first bush 75 starts, it is possible to make the compressive deformation act to firstly squash the first and second easily-deformable portions 75d1, 75e, which are present on the front side of the first bush 75.

Further, arrangement can be made as follows. That is, the first bush (the third elastic portion) 75 is formed in a cylindrical shape having the hollow portion 75b substantially in a cylindrical shape, and the first rod member 79 substantially in a cylindrical shape for guiding the movement of the first bush 75 along the axial direction is arranged to penetrate through the hollow portion 75b of the first bush 75. By this arrangement, the movement of the first bush 75 along the axial direction can be smoothly guided.

Still further, arrangement can be made such that the first rod member 79 is provided with annular stepped portion 79c at which the outer diameter becomes smaller on the side opposite to the simulator piston 67, and the inner wall of the hollow portion 75b of the first bush 75 is provided with the annular receiving portion 75f against which the annular stepped portion 79c hits. By this arrangement, reaction force non-linear characteristic created by the first bush 75 can be surely transferred to the first rod member 79. Further, just in case that attaching the first bush 75 in a direction (upside down) opposite to a normal direction is attempted, as the annular stepped portion 79c of the first rod member 79 hits against a portion, other than the annular receiving portion 75f, of the first bush 75. In this case, penetration of the first rod member 79 through the hollow portion 75b is prevented. Accordingly, it is possible to prevent in advance attaching the first bush 75 in a direction opposite to the normal direction.

Further, arrangement can be made such that a cut-out portion 75d2 is provided at least at a part of the first bush 75. By this arrangement, in case that a structure where the first bush 75 is filled with liquid such as brake fluid, air having mixed in the first bush 75 itself can be quickly removed.

Still further, arrangement can be made such that plural first easily-deformable portions 75d1 are provided at intervals along the circumferential direction of the substantially circular shape, and the gaps between neighboring plural first easily-deformable portions 75d1 are made cut-out portions 75d2. By this arrangement, it is possible both to create reaction force non-linear characteristic and remove air with a simple structure.

Further, arrangement can be made such that the first easily-deformable portions 75d1 are formed by a convex portion or a concave portion in a dome shape, or a combination of these. By this arrangement, it is possible to realize a stroke simulator having appropriate reaction force characteristic with a simple structure.

Still further, as the first bush 75 has the tapered portions 75g1, 75h1, which are formed at the axial direction end margin of the substantially cylindrical shape of the first bush 75, it is possible to realize a stroke simulator having appropriate reaction force characteristic with a simple structure.

[Detailed Structure of Vehicular Hydraulic-Pressure Generation Device 14 in Second Embodiment of the Invention]

Figure 7:
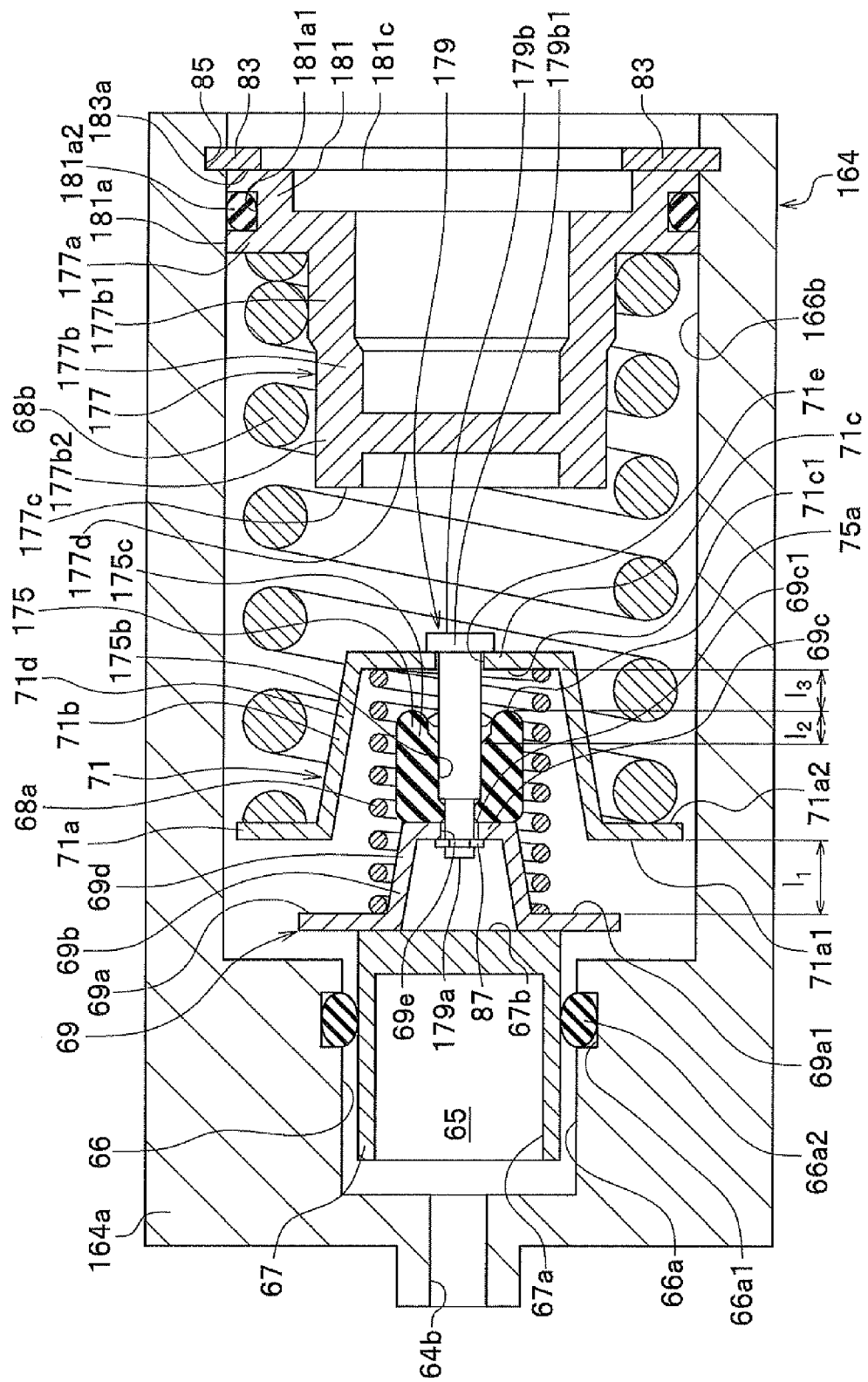
FIG. 7 is a vertical cross-sectional view of a second stroke simulator.

In the following, a second stroke simulator (corresponding to 'a reaction force generation section' referred to in the present invention) 164 with features of a hydraulic-pressure generation device 14 in a second embodiment of the present invention will be described, referring to drawings. FIG. 7 is a vertical cross-sectional view of the second stroke simulator.

The first stroke simulator 64 (see FIG. 3) with features of the vehicular hydraulic-pressure generation device 14 in the first embodiment, and the second stroke simulator 164 (see FIG. 7) with features of the hydraulic-pressure generation device 14 in the second embodiment have common basic elements therebetween. Accordingly, common symbols are assigned to elements virtually common therebetween, description of these elements will be omitted, and the following description will be focused on the difference therebetween.

Further, for elements corresponding therebetween, in order that the corresponding relationships between these corresponding elements can be easily recognized at a glance, symbols will be assigned, according to the following rule. That is, symbols assigned to elements in the first embodiment and symbols assigned to elements in the second embodiment will be made common in the last two digits. Symbol '1' will be assigned to the head of a symbol assigned to an element in the second embodiment. Concretely, for example, the first stroke simulator and the second stroke simulator are elements corresponding between the both embodiments, wherein '64' is assigned to the former one and symbol '164' is assigned to the latter one.

The first difference between the first stroke simulator (see FIG. 3) 64 and the second stroke simulator (see FIG. 7) 164 is in the peripheral structure of a third spring seat member 177 and a lid portion 181. While the lid portion 81 of the first stroke simulator 64 is provided separately from the third spring seat member 77, the lid portion 181 of the second stroke simulator 164 is provided such as to form a part of the third spring seat member 177 integrally with the third spring seat member 177.

In detail, the front end side of the housing 164a of the second stroke simulator 164 is provided with the lid portion 181 made of, for example, a metal substantially in a circular disc disk shape, similarly to the case of the first stroke simulator 64. The lid portion 181 is arranged to form a part of the third spring seat member 177 integrally with the third spring seat member 177. The lid portion 181 has a function to receive and stop the front end side of the second return spring 68b.

The outer circumferential wall 181a of the lid portion 181 is provided with an annular groove portion 181a1. A seal ring 181a2 of, for example, silicon rubber, is fitted in the annular groove portion 181a1. Thus, gastight sealing by the seal ring 181a2 prevents fluid such as air, brake fluid, and the like, which fills the inside of a second cylinder 166b, from leaking to the front side of the seal ring 181a2.

The third spring seat member 177 of the second stroke simulator second stroke simulator 164 includes a flange portion 177a in a disk shape hollowed at the central portion, a circumferential wall portion 177b extending in a circumferential shape from the inner circumferential portion of the flange portion 177a toward the rear side, and a top wall portion 177c covering the top portion of the circumferential wall portion 177b. The flange portion 177a of the third spring seat member 177 is provided integrally with the above-described lid portion 181. That is the flange portion 177a is also a part of the lid portion 181.

The circumferential wall portion 177b includes a base portion 177b1 with an outer diameter slightly smaller than the inner diameter of the second return spring 68b, and a small diameter portion 177b2 with a diameter slightly smaller than that of the base portion 177b1.

The front-end-side circumferential side portion 181c of the lid portion 181 is in contact with and supported by the rear portion circumferential side wall of a stop ring 83, similarly to the case of the lid portion 81 in the first embodiment. This stop ring 83 is provided such as to engage with an annular groove 85 recessed and formed on the inner wall of the second cylinder 166b. Thus, the third spring seat member 177 is fixed to the housing 164a of the second stroke simulator 164 through the lid portion 181. Further, the front end side of the second return spring 68b is surely fixed to the housing 164a of the second stroke simulator 164.

For the first stroke simulator 64, the penetration hole 77e is provided substantially at the central portion of the top wall portion 77c of the third spring seat member 77. In contrast, for the second stroke simulator 164, instead of a hole portion corresponding to the penetration hole 77e in the first embodiment, an accommodating portion 177 in a recessed shape for allowing a progress of the expanding portion 179b1 of a second rod member 179 is formed substantially at the central portion of the top wall portion 177c of the third spring seat member 177. As described later, this is based on changes in the second rod member 179 itself (The length of the second rod member 179 is shortened.) and the peripheral structure thereof. The basic functions and actions of the third spring seat member 177 and the lid portion 181 are common with the first stroke simulator 64.

The second difference between the first stroke simulator 64 (see FIG. 3) and the second stroke simulator 164 (see FIG. 7) is in the second rod member 179 itself and its peripheral structure. As shown in FIG. 3, the first rod member 79 of the first stroke simulator 64 is provided such as to penetrate through the penetration holes 69e, 71e, 77e provided substantially at the central portions of the first to third spring seat members 69, 71, 77, and the hollow portion 75b of the first bush 75. On the other hand, as shown in FIG. 7, the second rod member 179 of the second stroke simulator 164 is provided such as to penetrate through the penetration holes 69e, 71e provided substantially at the central portions of the respective top wall portions 69c, 71c of the first and second spring seat member 69, 71, and the hollow portion 75b of the first bush 75.

In brief, the length of the second rod member 179 is shortened. The support mechanism of the second rod member 179 is common with the support mechanism of the first rod member 79 in the first embodiment. Concretely, the rear end side 179a of the second rod member 179 is stopped by the engaging stop member 87 on the rear end side of the top wall portion 69c of the first spring seat member 69. The expanding portion 179b1 is formed on the front end side 179b of the second rod member 179, the expanding portion 179b1 having a diameter larger than that of the penetration hole 71e formed through the top wall portion 71c of the second spring seat member 71. Thus, the joining relationship between the front end side 179b of the second rod member 179 and the penetration hole 71e provided through the top wall portion 71c of the second spring seat member 71 is prevented from being easily lost.

[Operation and Advantages of Vehicular Hydraulic-Pressure Generation Device 14 in Second Embodiment]

In the following, the operation and advantages of the vehicular hydraulic-pressure generation device 14, in the second embodiment, provided with the second stroke simulator 164 will be described, focusing on portions different from the vehicular hydraulic-pressure generation device 14, in the first embodiment, provided with the first stroke simulator 64. The length of second stroke simulator 164 of the vehicular hydraulic-pressure generation device 14 in the second embodiment is shortened, compared with the first rod member 79 of the first stroke simulator 64. Accordingly, the second stroke simulator 164 operates as follows.

That is, first, when the brake pedal 12 is operated by the driver, a hydraulic pressure is generated, and this hydraulic pressure is transferred to the simulator piston 67 inside the cylinder portion 66. Then, the simulator piston 67 moves inside the cylinder portion 66. Accompanying the movement of the simulator piston 67 in the forward direction, the first spring seat member 69 moves to the front side. Accompanying this movement, the second rod member 179 progresses in the forward direction, protruding from the top wall portion 71c of the second spring seat member 71.

When the brake pedal 12 is strongly operated by the driver, the front end wall 69a1 of the flange portion 69a of the first spring seat member 69 finally comes to hit against the rear end wall 71a1 of the flange portion 71a of the second spring seat member 71. When the brake pedal 12 is operated further stronger by the driver, the second spring seat member 71 moves to the side of the third spring seat member 177 against the elastic force of the second return spring 68b. Accompanying this movement, the second rod member 179 progresses in the forward direction, protruding from the top wall portion 71c of the second spring seat member 71.

On the other hand, the top wall portion 177c of the third spring seat member 177 is provided with the accommodating portion 177 in a recessed shape. Thus, even when the second rod member 179 progresses in the forward direction, protruding from the top wall portion 71c of the second spring seat member 71, the accommodating portion 177 acts to accommodate the progression of the expanding portion 179b1 of the second rod member 179. Accordingly, by the vehicular hydraulic-pressure generation device 14 in the second embodiment, it is possible to avoid in advance contact between the second rod member 179 and the top wall portion 71c of the second spring seat member 71.

Further, in the second stroke simulator 164 of the vehicular hydraulic-pressure generation device 14 in the second embodiment, the lid portion 181 for receiving and stopping the side of the second return spring (the second elastic portion) 68b, the side being opposite to the connection side with the first return spring (the first elastic portion) 68a, is provided on the opposite side of the cylinder portion 66 that houses the simulator piston 67, the opposite side being opposite to the simulator piston 67. In more detail, the lid portion 181 is arranged such as to form a part of the third spring seat member 177, integrally with the third spring seat member 177. Thus, the vehicular hydraulic-pressure generation device 14 in the second embodiment enables reduction in the number of components and reduction in weight.

[Detailed Structure of Vehicular Hydraulic-Pressure Generation Device 14 in Third Embodiment of the Invention]

Figure 8:
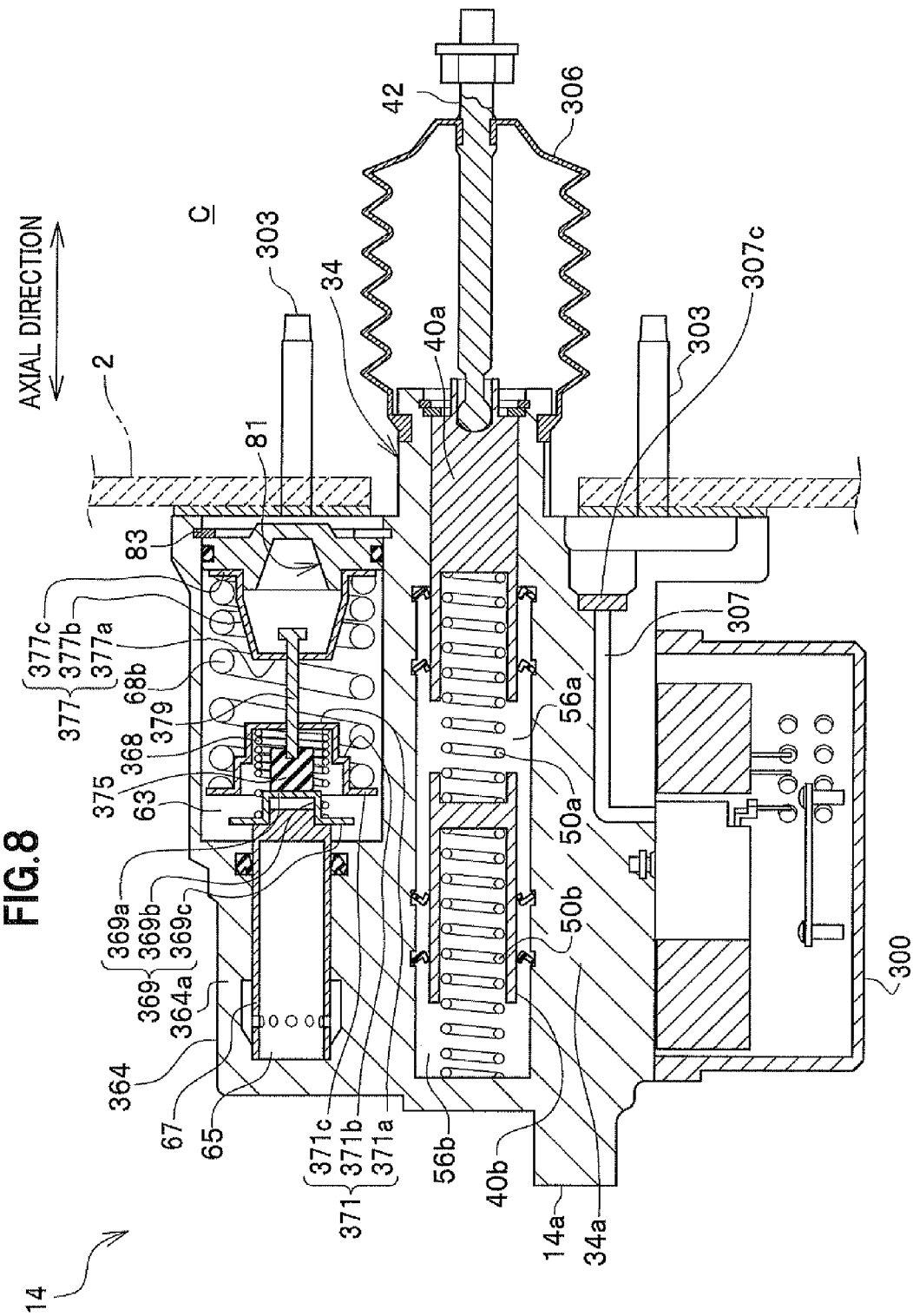
FIG. 8 is a vertical cross-sectional view of a vehicular hydraulic-pressure generation device provided with a third stroke simulator in a third embodiment.

In the following, a vehicular hydraulic-pressure generation device 14 in a third embodiment of the present invention will be described in detail, referring to FIG. 8. FIG. 8 is a vertical cross-sectional view of the vehicular hydraulic-pressure generation device 14 in a third embodiment provided with a third stroke simulator 364. The third stroke simulator 364 corresponds to 'a reaction force generation section' referred to in the present invention.

The first stroke simulator 64 (see FIG. 3) with features of the vehicular hydraulic-pressure generation device 14 in the first embodiment and the third stroke simulator 364 (see FIG. 8) with features of the hydraulic-pressure generation device 14 in the third embodiment have common basic elements therebetween. Accordingly, common symbols are assigned to elements common therebetween. Further, for elements corresponding therebetween, in order that the corresponding relationships between these corresponding elements can be easily recognized at a glance, symbols will be assigned, according to the following rule. That is, symbols assigned to elements in the first embodiment and symbols assigned to elements in the third embodiment will be made common in the last two digits. Symbol '3' will be assigned to the head of a symbol assigned to an element in the third embodiment. Concretely, for example, the first stroke simulator and the second stroke simulator are elements corresponding between the both embodiments, wherein '64' is assigned to the former one and symbol '364' is assigned to the latter one.

The vehicular hydraulic-pressure generation device 14 in the third embodiment according to the present invention is, as shown in FIG. 8, provided with a master cylinder 34 (hydraulic pressure generation section) and a third stroke simulator 364 (reaction force supplication section). The master cylinder 34 is extended along the front/rear direction (front/rear direction shown in FIG. 1) of a vehicle V (see FIG. 1), and is arranged integrally and parallel with the third stroke simulator 364.

As shown in FIG. 8, in the housing 34a of the master cylinder 34, there are provided first and second pistons 40a, 40b, first and second hydraulic chambers 56a, 56b, and first and second spring members 50a, 50b. The first and second pistons 40a, 40b are arranged movable forward and backward in the master cylinder 34, in association with the brake pedal 12. The first hydraulic chamber 56a is formed, being partitioned by the inner wall portion of the master cylinder 34, and the first and second pistons 40a, 40b. The second hydraulic chamber 56b is formed, being partitioned by the inner wall portion of the master cylinder 34, and the second piston 40b. The spring member 50a is provided in the first hydraulic chamber 56a and has a function to connect the first piston 40a and the second piston 40b. The second spring member 50b is provided in the second hydraulic chamber 56b and has a function to connect the second piston 40b and the inner wall portion of the master cylinder 34. The housing 34a of the master cylinder 34 is formed integrally with the housing 364a of the third stroke simulator 364, for example, by molding to form the housing 14a of the vehicular hydraulic-pressure generation device 14 in the third embodiment.

The vehicular hydraulic-pressure generation device 14 in the third embodiment is, as shown in FIG. 8, attached to a dashboard 2 by a stud bolt 303 provided for the housing 14a. A first reservoir 36 (see FIG. 2) is provided higher (on the side in front of the sheet of FIG. 8) than the housing 14a, extending along the axial direction among the master cylinder 34 and the third stroke simulator 364 in a view from the above. Further, the housing 14a is provided with the relief ports 52a, 52b and the connection ports 20a, 20b shown in FIG. 2. The first hydraulic pressure passage 58a and the second hydraulic pressure passage 58b, and the branched hydraulic passage 58c shown in FIG. 2 are formed in the solid portion of the housing 14a by holes.

The master cylinder 34 is, as shown in FIG. 8, arranged such as to accommodate a push rod 42, wherein one end side of the push rod 42 is connected with the brake pedal 12 (see FIG. 12) and the other end side of the push rod 42 is accommodated by the push rod 42. The push rod 42 is covered by a boot 306 extending over the master cylinder 34 and the push rod 42. The master cylinder 34 is extending on the brake pedal 12 side into a vehicle interior C, penetrating through the dashboard 2.

Further, a sensor valve unit 300, shown in FIG. 8, houses the first shut-off valve 60a, the second shut-off valve 60b, the third shut-off valve 62, the pressure sensor Pp, and the pressure sensor Pm, which are shown in FIG. 2, and a circuit board (not shown) mounting a pressure detection circuit for computing the hydraulic pressure of brake fluid by electrically processing detection signals from these pressure sensors Pp, Pm. The sensor valve unit 300 is provided with a vent 307 communicated with the inside of the sensor valve unit 300. A waterproof vent member 307c, which is made of Gore-Tex (registered trademark) for example, is provided at the opening portion of the vent 307.

Incidentally, the vehicular hydraulic-pressure generation device 14 in the third embodiment may be arranged to include a breather (not shown) for removing air that remains in the master cylinder 34, the third stroke simulator 364, a hydraulic passage, or the like.

[Detailed Structure of Third Stroke Simulator 364]

Figure 9:
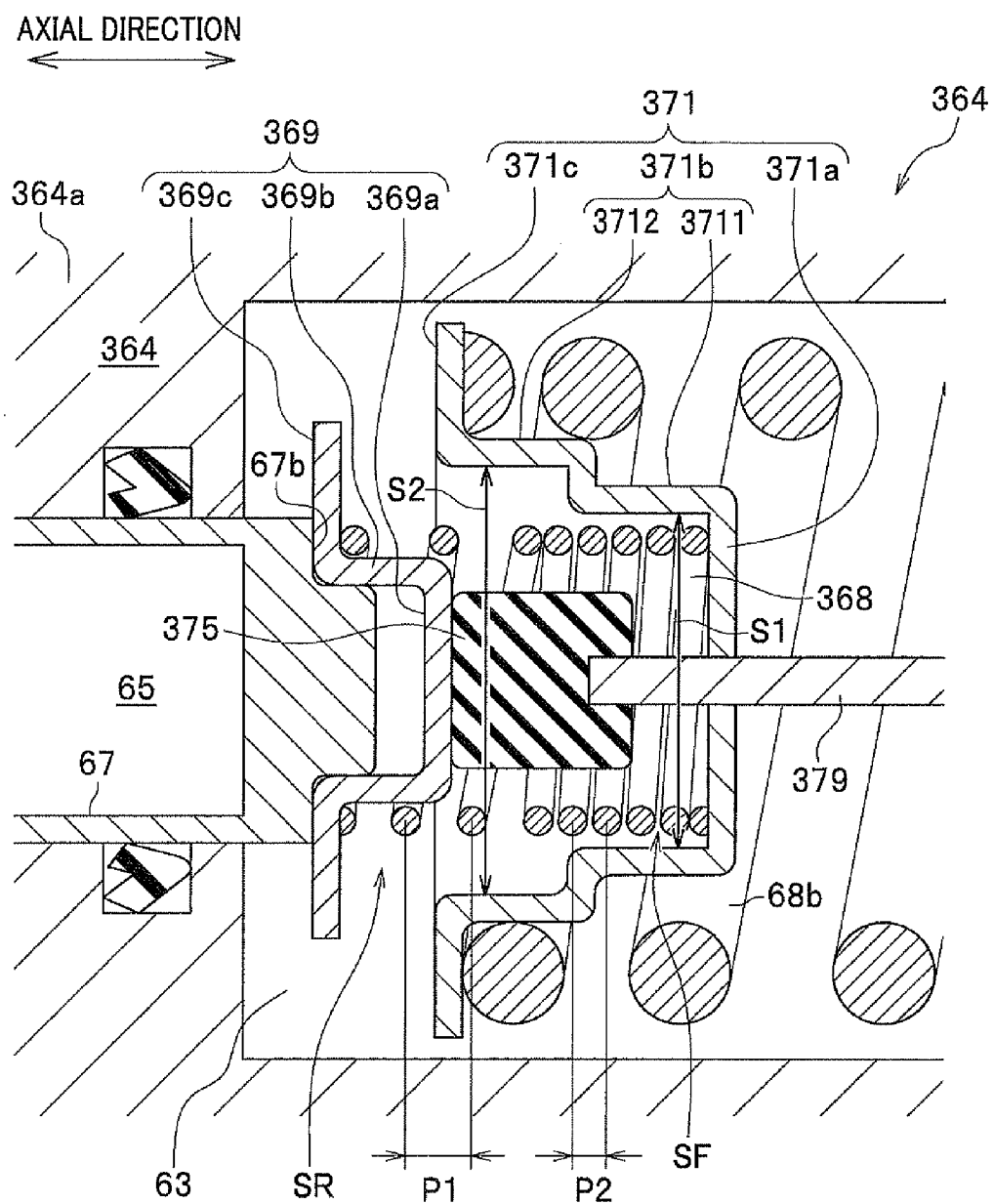
FIG. 9 is an enlarged vertical cross-sectional view showing the main part of the third stroke simulator.

In the following, the third stroke simulator 364 will be described in detail, referring to FIG. 9. FIG. 9 is an enlarged vertical cross-sectional view showing the main part of the third stroke simulator.

In the description of the third stroke simulator 364, similarly to the vehicular hydraulic-pressure generation device 14 in the first embodiment, the backward direction of the simulator piston 67 (leftward in FIG. 9) will be defined as 'backward', and the forward direction (rightward in FIG. 9) of the simulator piston 67 will be described as 'forward'.

As shown in FIG. 8 and FIG. 9, a reaction-force hydraulic chamber 65 housing the simulator piston 67 and a spring chamber 63 are provided inside the housing 364a of the third stroke simulator 364. The reaction-force hydraulic chamber 65 is communicated with the second hydraulic chamber 56b of the master cylinder 34.

The reaction-force hydraulic chamber 65 is formed substantially in a cylindrical shape. The spring chamber 63 is formed substantially in a cylindrical shape with a diameter larger than the diameter of the reaction-force hydraulic chamber 65. The reaction-force hydraulic chamber 65 and the spring chamber 63 integrally form a stepped and substantially cylindrical shape. An opening is formed on the opposite side, opposite to the simulator piston 67, of the housing 364a, the opening facing the space in the stepped and substantially cylindrical shape. A lid portion 81 is supported by a stop ring 83 at this opening.

As shown in FIG. 8 and FIG. 9, in the spring chamber 63, there are provided a first spring seat member 369, a second spring seat member 371, a third spring seat member 377, an unequal pitch spring 368, and a second return spring 68b. The unequal pitch spring 368 corresponds to 'a spring member' referred to in the present invention. In brief, the unequal pitch spring 368 corresponds to 'the first elastic portion' and the 'third elastic portion' referred to in the present invention.

As shown in FIG. 8, the first spring seat member 369, the second spring seat member 371, and the third spring seat member 377 are, as shown in FIG. 8, provided in this order from the rear side toward the front side inside the spring chamber 63. The respective vertical cross-sections of the first spring seat member 369, the second spring seat member 371, and the third spring seat member 377 are formed substantially in a hat shape.

The first spring seat member 369 is fixed and attached to the front end wall 67b of the simulator piston 67 by bonding means such as welding, as shown in FIG. 9. The first spring seat member 369 includes, as shown in FIG. 8 and FIG. 9, a bottom portion 369a in a disk shape provided perpendicular to the axial direction, a circumferential wall portion 369b extending backward from the circumferential margin of the bottom portion 369a, and a flange portion 369c extending outward along the radial direction from the rear end margin of the circumferential wall portion 369b.

As shown in FIG. 8 and FIG. 9, the second spring seat member 371 includes a disk shaped bottom portion 371a provided perpendicular to the axial direction, a circumferential wall portion 371b extending backward from the circumferential margin of the bottom portion 371a and covering the outer circumference of the unequal pitch spring 368 (describe later in detail), and a flange portion 371c extending outward along the radial direction from the end margin of the circumferential wall portion 371b. The bottom portion 371a of the second spring seat member 371 is provided such as to face the direction (the side opposite to the simulator piston) in common with the bottom portion 369a of the first spring seat member 369.

As shown in FIG. 8, the third spring seat member 377 includes a disk shaped bottom portion 377a provided perpendicular to the axial direction, a circumferential wall portion 377b extending forward from the circumferential margin of the bottom portion 377a, and a flange portion 377c extending outward along the radial direction from the end margin of the circumferential wall portion 377b.

The second spring seat member 371 corresponds to 'a spring seat member' referred to in the present invention. The bottom portion 371a of the second spring seat member 371 corresponds to 'a bottom portion supporting a side of the spring member, the side being opposite to the simulator piston' referred to in the present invention. The circumferential wall portion 371b of the second spring seat member 371 corresponds to 'a circumferential wall portion extending from a circumferential margin of the bottom portion to cover an outer circumference of the spring member' referred to in the present invention. The second spring seat member 371 and the third spring seat member 377 are provided inside the spring chamber 63 such that the bottom portions 371a and 377a thereof face each other.

The flange portion 371c of the second spring seat member 371 and the flange portion 377c of the third spring seat member 377 respectively support, as shown in FIG. 8, the front end portion and the rear end portion of the unequal pitch spring 368 such as to sandwich the unequal pitch spring 368. The circumferential wall portion 371b of the second spring seat member 371 and the circumferential wall portion 377b of the third spring seat member 377 are respectively provided on the inner circumferential side of the second return spring 68b. The lid portion 81 supported by the housing 364a is provided on the opposite side of the third spring seat member 377, the opposite side being opposite to the simulator piston 67. The lid portion 81 supports the third spring seat member 377.

The unequal pitch spring 368 and the second return spring 68b are respectively formed by a compression coil. In the vehicular hydraulic-pressure generation device 14 in the third embodiment of the present invention, the second return spring 68b is formed such that the wire diameter thereof is larger compared with the unequal pitch spring 368. In brief, the spring constant of the second return spring 68b is set larger than the spring constant of the unequal pitch spring 368.

As described above, the second return spring 68b is supported being sandwiched between the second spring seat member 371 and the third spring seat member 377. On the other hand, the unequal pitch spring 368 is supported being sandwiched between the first spring seat member 369 and the second spring seat member 371 on the inner circumferential side of the circumferential wall portion 371b of the second spring seat member 371. The simulator piston 67 side of the unequal pitch spring 368 is in contact with the flange portion 369c of the first spring seat member 369. The opposite side, opposite to the simulator piston 67, of the unequal pitch spring 368 is in contact with the bottom portion 371a of the second spring seat member 371.

In brief, the unequal pitch spring 368 and the second return spring 68b are provided serially between the first spring seat member 369 and the third spring seat member 377.

Incidentally, symbols 379 in FIG. 8 and FIG. 9 represents the third rod member that extends along the axial direction and penetrates through the centers of the bottom portions 371a, 377a of the second spring seat member 371 and the third spring seat member 377. The third rod member 379 is provided such as to be able to move axially and relatively to the second spring seat member 371 and the third spring seat member 377. The simulator piston 67 side of the third rod member 379 is supported by a resin member 375 arranged on the inner circumferential side of the unequal pitch spring 368. The resin member 375 in the present third embodiment is formed by an elastic material such as a synthetic rubber. The resin member 375 is supported in contact with the bottom portion 369a of the first spring seat member 369. The resin member 375 has a function to buffer a displacement caused by an input load of the simulator piston 67.

The circumferential wall portion 371b of the second spring seat member 371 located between the first spring seat member 369 and the third spring seat member 377 is, as shown in FIG. 9, formed in a stepped shape having a small diameter portion 3711, which is formed on the bottom portion 371a side, and a large diameter portion 3712, which has a diameter larger than that of the small diameter portion 3711 and is formed on the flange portion 371c side. The unequal pitch spring 368 is provided such that the front portion SF thereof is located on the inner circumferential side of the small diameter portion 3711 of the circumferential wall portion 371b, and the rear portion SR thereof is located on the inner circumferential side of the large diameter portion 3712 of the circumferential wall portion 371b. In brief, the circumferential wall portion 371b of the second spring seat member (a spring seat member) 371 is arranged such that, as shown in FIG. 9, the transverse cross-sectional area S2 of the portion corresponding to the portion (the rear portion SR) of the unequal pitch spring 368, the rear portion SR having a larger pitch, is set larger than the transverse cross-sectional area S1 of the portion corresponding to the portion (the front portion SF) of the unequal pitch spring 368, the front portion SF having a smaller pitch than the above.

Incidentally, regarding the distinction between the front portion SF and the rear portion SR of the unequal pitch spring 368 in the third embodiment, the spring portion located on the simulator piston 67 side of the center of the spring length substantially corresponds to the rear portion SR, and spring portion located on the opposite side, opposite to the simulator piston 67, of the center of the spring length corresponds to the front portion SF.

The unequal pitch spring (a spring member) 368 in the third embodiment is formed by serially and integrally connecting spring members, the spring members having pitches different from each other. The unequal pitch spring 368 has the front portion SF, which is a region with a smaller spring constant, and the rear portion SR, which is a region with a larger spring constant than that of the front portion SF. In other words, the unequal pitch spring 368 includes plural regions with different numbers of turns of wire per unit length (effective number of turns). In detail, for the unequal pitch spring 368, the pitch P1 of the rear portion SR is set larger than the pitch P2 of the front portion SF (P1>P2).

For the unequal pitch spring 368, the spring constant k4 of the rear portion SR is set larger than the spring constant k5 of the front portion SF (k4>k5). Incidentally, although, in the third embodiment, an example of an embodiment, in which adjustment of a spring constant is carried out by adjusting a pitch, has been described, the invention is not limited to this example. Instead of the embodiment in which adjustment of a spring constant is carried out by adjusting a pitch, arrangement may be made such that a spring constant k is adjusted by adjusting one or more parameters which are selected from a group of parameters G, d, Na, and D in the following Expression (1).

$$k = G \cdot d4/(8Na \cdot D3)$$ Expression (1)

Herein, parameter G represents the modulus of transverse elasticity of a spring material. Parameter d represents the wire diameter of a spring. Parameter Na represents the effective number of turns of the spring. Parameter D represents the average coil diameter.

The magnitude relationship between pitches of the unequal pitch spring (the spring member) 368 in the present invention refers to the magnitude relationship in a state of setting the unequal pitch spring 368 in the third stroke simulator 364. Incidentally, the magnitude relationship between pitches of the unequal pitch spring 368 is almost the same also in a state before setting the unequal pitch spring 368 in the third stroke simulator 364. This is because, in case of contracting the unequal pitch spring 368 from an expanding state before setting the unequal pitch spring 368 in the third stroke simulator 364 to a set length thereof, the spring region (the front portion SF) with a smaller spring constant and a smaller pitch is contracted prior to the spring region (the rear portion SR) with a larger spring constant and a larger pitch.

[Operation and Advantages of Vehicular Hydraulic-Pressure Generation Device 14 in Third Embodiment]

Figure 10:
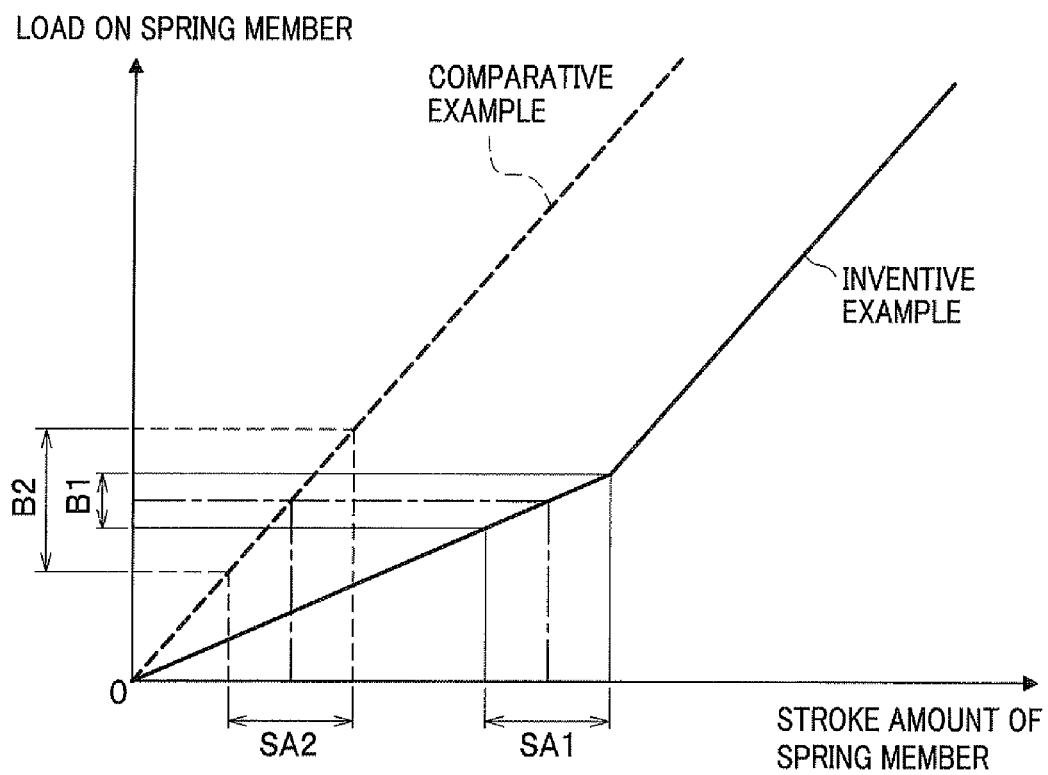
FIG. 10 is a diagram illustrating action in an embodiment in comparison with a comparative example.

In the following, the operations and advantages of the vehicular hydraulic-pressure generation device 14, in the third embodiment, provided with the third stroke simulator 364 will be described with reference to FIG. 10, focusing on points different from the vehicular hydraulic-pressure generation device 14, in the first embodiment, provided with the first stroke simulator 64. FIG. 10 is a diagram illustrating the action of the third stroke simulator, in comparison with a comparative example (the conventional art related to Patent Literature 1). In FIG. 10, the horizontal axis represents the stroke amount of a spring member, and the vertical axis represents the load of the spring member.

The spring member in the comparative example is assumed to be a compression spring to be used for the stroke simulator described in Patent Literature 1, having a spring wire diameter, an effective number of coil turns of spring, and an average coil diameter, which are constant along the spring length. In contrast, the spring member in the third embodiment of the present invention is an unequal pitch spring 368. Uneven pitches are set for the unequal pitch spring 368 such that the pitch P2 of the front portion SF is set substantially the same as the spring member in the comparative example, while the pitch P1 of the rear portion SR is set larger than the pitch P2 of the front portion SF. Incidentally, the spring material, the wire diameter, and the average coil diameter of the unequal pitch spring 368 in the third embodiment are set substantially the same as those of the spring member in the comparative example.

For the stroke simulator in the comparative example, in order to make appropriate returning of the simulator piston and realize an appropriate pedal feel, a high accuracy management of the spring member is required so that a target set load is surely attained.

Herein, as shown in FIG. 10, assumed will be a case that a spring member used in the stroke simulator in the comparative example is built in the stroke simulator in the comparative example with a certain set length L1, and setting to a target set load N1 is attempted.

As a spring member used for a stroke simulator in such a comparative example has a spring constant, which is constant along the spring length direction, if the set length varies in a range of SA2 with respect to L1, the set load deviates in a range of B2 with respect to the target N1.

In brief, with the stroke simulator in the comparative example, there is a case that the set load becomes the lower limit vale of the range B2 to cause an insufficient return of the simulator piston, or conversely it is possible that the set load becomes the upper limit value of the range B2 to make it impossible to realize an appropriate pedal feel.

On the other hand, in the case of the unequal pitch spring (spring member) 368 in the third embodiment, a brake reaction force is generated in collaboration with the unequal pitch spring 368, at the rear portion SR with a pitch substantially the same as the spring member in the comparative example. That is, the rear portion SR becomes a portion that forms an original brake reaction force by the third stroke simulator 364. The relationship of the load of the third stroke simulator 364 to the stroke amount of the third stroke simulator 364 at the rear portion SR is in a characteristic with the same gradient as that in the comparative example shown in FIG. 10.

On the other hand, as the front portion SF of the unequal pitch spring 368 has a pitch smaller than that of the rear portion SR, and the spring constant is smaller, the relationship of load of the unequal pitch spring 368 to the stroke amount of the unequal pitch spring 368 is, as shown in FIG. 10, in a characteristic with a gradual gradient compared with the comparative example. That is, when the unequal pitch spring 368 is contracted to be built in the third stroke simulator 364, the front portion SF with a smaller pitch than that of the rear portion SR firstly (in priority) contracts such as to follow the characteristic, shown in FIG. 10, with a gradual gradient compared with the comparative example.

Thus, in the case of the unequal pitch spring 368 in the third embodiment, as shown in FIG. 10, when setting to the targeted load N1 is tried by building the unequal pitch spring 368 into the third stroke simulator 364 at a predetermined set length L2, even when variation occurs in the range SA1 (SA1=SA2) with respect to the set length L2, it is possible to make the set load within the variation B1 (B1<B2, see FIG. 10) smaller than the variation B2 in the comparative example, with respect to the target N1.

In the hydraulic-pressure generation device 14 in the third embodiment, instead of the first elastic portion and the third elastic portion referred to the present invention, the unequal pitch spring (spring member) 368 is formed by serially and integrally connecting spring members having pitches different from each other.

Accordingly, by the hydraulic-pressure generation device 14 in the third embodiment, as it is possible to make variation in the set load of the unequal pitch spring 368 small, high accuracy management of the unequal pitch spring (spring member) 368 can be realized.

Further, by the vehicular hydraulic-pressure generation device 14 in the third embodiment, as it is possible to easily and simply perform setting of a set load with high accuracy, the performance of a vehicular brake system 10, to which the vehicular hydraulic-pressure generation device 14 is applied, can be significantly improved. Further, the manufacturing process can be simplified, and further, the manufacturing cost can be reduced.

Further, by the hydraulic-pressure generation device 14 in the third embodiment, after setting the unequal pitch spring 368 to the third stroke simulator 364, it is possible to make the returning of the simulator piston 67 satisfactory by using a large repulsion force of the portion (the front portion SF of the unequal pitch spring 368) with a smaller pitch.

Still further, by the hydraulic-pressure generation device 14 in the third embodiment, as the unequal pitch spring (spring member) 368 corresponding to 'the first elastic portion' and 'the third elastic portion' referred to in the present invention is formed by serially and integrally connecting spring members with pitches different from each other, the effect of reducing a feeling of strangeness at the time of braking operation, the effect being similar to that of the vehicular hydraulic-pressure generation device 14 in the first embodiment, can be expected.

For the vehicular hydraulic-pressure generation device 14 in the third embodiment, the resin member 375 supported by the simulator piston 67 is provided on the inner circumferential side of the unequal pitch spring (spring member) 368, and the pitch P1 on the simulator piston 67 side of the unequal pitch spring (spring member) 368 is set larger than the pitch P2 on the opposite side.

Accordingly, by the vehicular hydraulic-pressure generation device 14 in the third embodiment, when the unequal pitch spring 368 is contracted by the simulator piston 67, the resin member 375 moves on the inner circumferential side of the unequal pitch spring 368, from the rear portion SR with a larger pitch of the unequal pitch spring 368 and larger variation in the dimension along the radial direction, toward the front portion SF with a smaller pitch and smaller variation in the dimension along the radial direction, it is possible to prevent in advance contact between the unequal pitch spring 368 and the resin member 375.

Further, as it is possible to reduce the distance (gap) between the resin member 375 and the unequal pitch spring 368 on the inner circumferential side of the unequal pitch spring 368, downsizing of the vehicular hydraulic-pressure generation device 14 can be attained.

Further, for the vehicular hydraulic-pressure generation device 14 in the third embodiment, the transverse cross-sectional area S2 of the circumferential wall portion 371b of the second spring seat member (spring seat member) 371, the transverse cross-sectional area S2 corresponding to the larger pitch portion (the rear portion SR) of the unequal pitch spring 368, is set larger than the transverse cross-sectional area S1 corresponding to the smaller, compared with the above, pitched portion (the front portion SF) of the unequal pitch spring 368.

Accordingly, by the hydraulic-pressure generation device 14 in the third embodiment, it is possible to prevent in advance contact between the rear portion SR of the unequal pitch spring 368, the rear portion SR has a large pitch and largely varies in the dimension along the radial direction, and the circumferential wall portion 371b of the second spring seat member 371.

Further, the hydraulic-pressure generation device 14 in the third embodiment is provided with the third rod member 379, the third rod member 379 penetrating along the expansion and contraction direction of the unequal pitch spring (a spring member) 368 through the bottom portion 371a of the second spring seat member (spring seat member) 371; the third rod member 379 is supported such as to be movable relatively to the second spring seat member (spring seat member) 371 along the expansion and contraction direction; and the simulator piston 67 side of the third rod member 379 is supported by the resin member 375.

Accordingly, by the vehicular hydraulic-pressure generation device 14 in the third embodiment, the unequal pitch spring 368 is contracted by the simulator piston 67, and when the unequal pitch spring 368 is thereafter uncompressed, the third rod member 379 can guide the movement of the simulator piston 67 and the unequal pitch spring 368 along the axial direction. As a result, by the vehicular hydraulic-pressure generation device 14 in the third embodiment, the moving action of the simulator piston 67 and the unequal pitch spring 368 can be smoothly performed.

[Detailed Structure of Vehicular Hydraulic-Pressure Generation Device 14 in Fourth Embodiment of the Invention]

Figure 11:
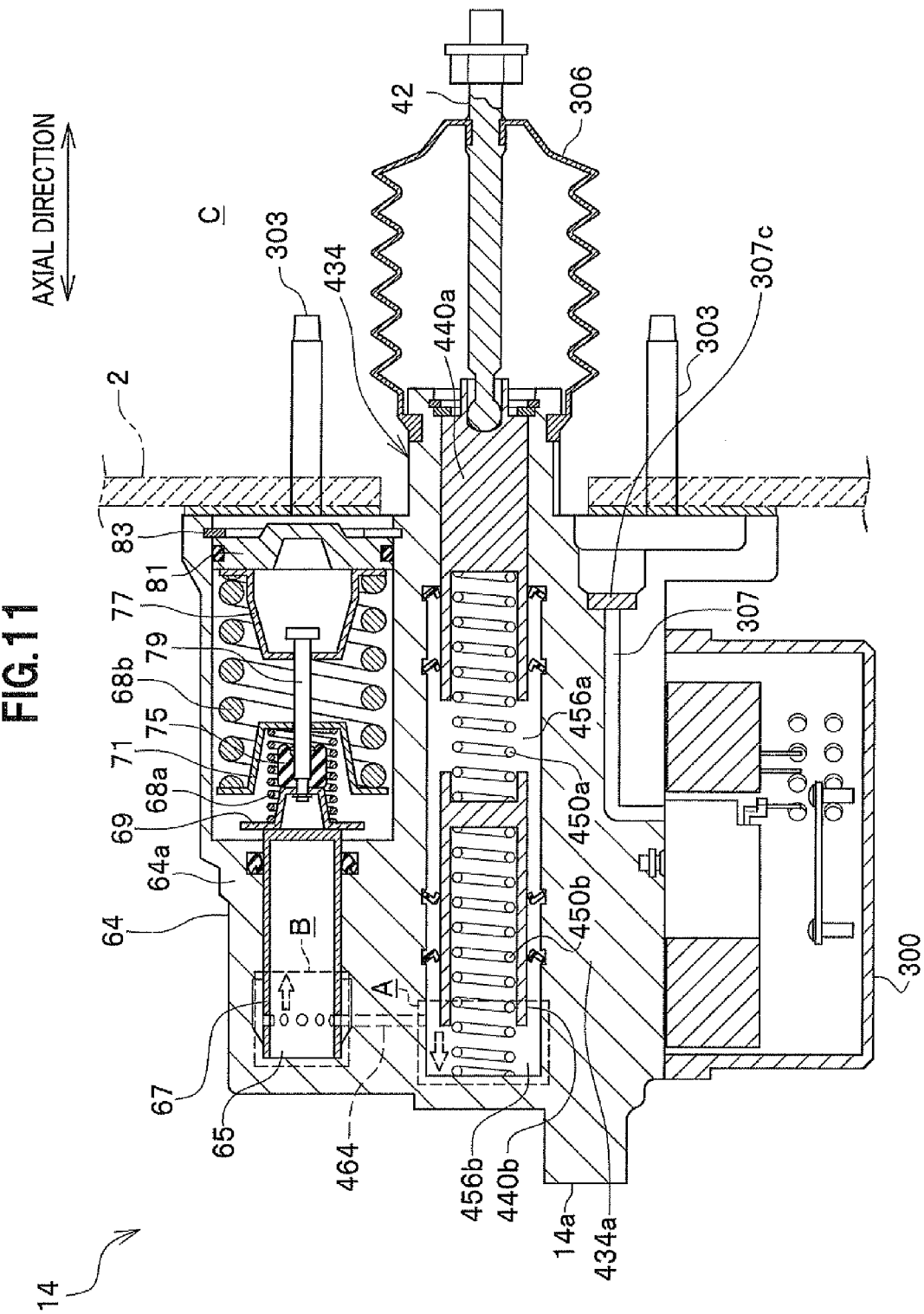
FIG. 11 is a vertical cross-sectional view of a vehicular hydraulic-pressure generation device provided with the first stroke simulator in a fourth embodiment.

In the following, a vehicular hydraulic-pressure generation device 14 in a fourth embodiment of the present invention will be described in detail, referring to FIG. 11. FIG. 11 is a vertical cross-sectional view of the vehicular hydraulic-pressure generation device in the fourth embodiment provided with the first stroke simulator 64, shown in FIG. 3.

The vehicular hydraulic-pressure generation device 14 (see FIG. 8) in the third embodiment and the vehicular hydraulic-pressure generation device 14 (see FIG. 11) in the fourth embodiment have common or corresponding basic elements therebetween. Accordingly, common symbols are assigned to elements virtually common therebetween, description of these elements will be omitted, and the following description will be focused on the difference therebetween.

The first difference between the vehicular hydraulic-pressure generation device 14 (see FIG. 8) in the third embodiment and the vehicular hydraulic-pressure generation device 14 (see FIG. 11) in the fourth embodiment is that, while the third stroke simulator 364 is provided in the third embodiment, the first stroke simulator 64 is provided in the fourth embodiment. The operation and advantages of the first stroke simulator 64 are the same as described in the first embodiment.

The second difference between the vehicular hydraulic-pressure generation device 14 (see FIG. 8) in the third embodiment and the vehicular hydraulic-pressure generation device 14 (see FIG. 11) in the fourth embodiment is that, for the master cylinder 34 in the third embodiment, the maximum value of the hydraulic pressure generated in the first hydraulic chamber 56a is set substantially the same as the maximum value of the hydraulic pressure generated in the second hydraulic chamber 56b, and on the other hand, for a master cylinder 434 in the fourth embodiment, the maximum value of the hydraulic pressure generated in a second hydraulic chamber 456b is set lower than the maximum value of the hydraulic pressure generated in a first hydraulic chamber 456a.

In detail, inside the housing 434a of the master cylinder 434 in the fourth embodiment, there are provided, as shown in FIG. 11, first and second pistons 440a, 440b, first and second hydraulic chambers 456a, 456b, and first and second spring members 450a, 450b.

The first and second pistons 440a, 440b are provided movably forward and backward in the master cylinder 434, in association with a brake pedal 12. The first hydraulic chamber 456a is partitioned and formed by the inner wall portion of the master cylinder 434, the first piston 440a, and the second piston 440b. The second hydraulic chamber 456b is partitioned and formed by the inner wall portion of the master cylinder 434 and the second piston 440b. The first spring member 450a is provided in the first hydraulic chamber 456a and has a function to connect the first piston 440a and the second piston 440b. The spring member 450b is provided in the second hydraulic chamber 456b and has a function to connect the second piston 440b and the inner wall portion of the master cylinder 34. The housing 434a of the master cylinder 434 is formed integrally with the housing 64a of the first stroke simulator 64, for example, by molding, and forms the housing 14a of the vehicular hydraulic-pressure generation device 14 in the fourth embodiment. The second hydraulic chamber 456b is, as shown in FIG. 11, communicated with a reaction-force hydraulic chamber 65 through a hydraulic passage 464.

Herein, what is important with the vehicular hydraulic-pressure generation device 14 in the fourth embodiment is, as described in detail later, that for the master cylinder 434 in the fourth embodiment, the maximum value of the hydraulic pressure generated in the second hydraulic chamber 456b is set lower than the maximum value of the hydraulic pressure generated in the first hydraulic chamber 456a. Concretely, for example, the maximum capacity of the second hydraulic chamber 456b is set smaller than the maximum capacity of the reaction-force hydraulic chamber 65.

The region enclosed by dashed lines represented by symbol 'A' in FIG. 11 conceptually represents the capacity of the second hydraulic chamber 456b. The capacity of the second hydraulic chamber 456b becomes the maximum in a loadless state of the master cylinder 434. The region enclosed by dashed lines represented by symbol 'B' in FIG. 11 conceptually represents the capacity of the reaction-force hydraulic chamber 65. The capacity B of the reaction-force hydraulic chamber 65 becomes the maximum when the simulator piston 67 has moved forward to the bottom stop position.

For the vehicular hydraulic-pressure generation device 14 in the fourth embodiment, as shown in FIG. 11, the first spring member 450a connecting the first piston 440a and the second piston 440b, and the spring member 450b connecting the second piston 440b and the inner wall of the master cylinder 434, are set such as to have substantially the same elastic modulus.

Further, the first piston 440a is set such as to have a room until the second piston 40b reaches the bottom on the rod 42 side even if the second piston 40b reaches the bottom at the inner wall portion of the master cylinder 434. In other words, in a loadless state of the master cylinder 434, the distance between the opposite side, opposite to the push rod 42, of the second piston 440b and the inner wall portion of the master cylinder 434 is set smaller than the distance between the push rod 42 side of the second piston 40b and the opposite side, opposite to the push rod 42, of the first piston 40a.

[Operation and Advantages of Vehicular Hydraulic-Pressure Generation Device 14 in Fourth Embodiment]

Figure 12:
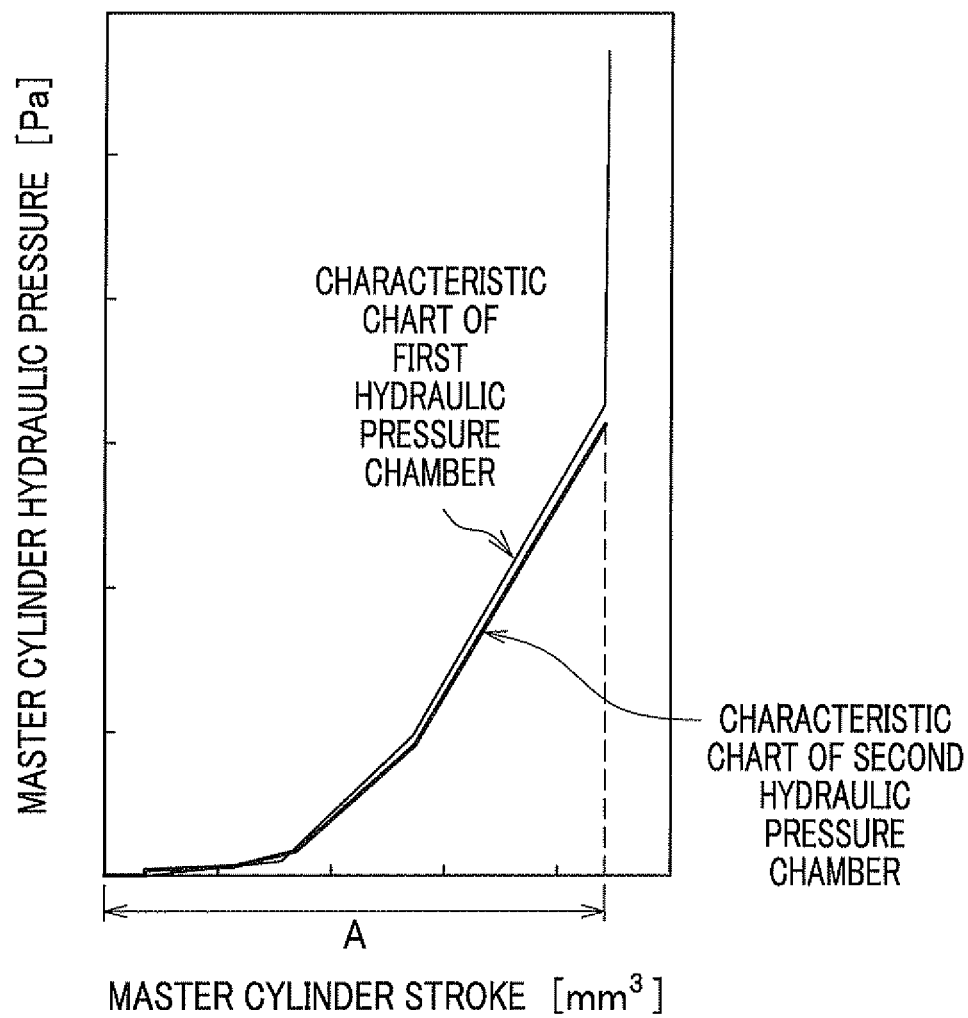
FIG. 12 is an illustration showing a comparison between characteristic charts of the hydraulic pressure vs. the stroke amount in a first hydraulic chamber and a second hydraulic chamber.

In the following, the operation and advantages of the vehicular hydraulic-pressure generation device 14, in the fourth embodiment, provided with the first stroke simulator 64 will be described with reference to FIG. 12, focusing on points different from the vehicular hydraulic-pressure generation device 14, in the first embodiment, provided with the first stroke simulator 64. FIG. 12 is an illustration showing a comparison between characteristic charts of the master cylinder hydraulic pressure [Pa] vs. the stroke amount (master cylinder stroke [mm3]) in the first hydraulic chamber 456a and the second hydraulic chamber 456b of the vehicular hydraulic-pressure generation device 14 in the fourth embodiment.

The characteristic chart represented by the thin solid line in FIG. 12 shows the hydraulic pressure in the first hydraulic chamber 56a vs. the stroke amount of the first piston 40a. The characteristic chart represented by the thick solid line in FIG. 12 shows the hydraulic pressure in the second hydraulic chamber 56b vs. the stroke amount of the second piston 40b. The master cylinder hydraulic pressure [Pa] related to the vertical axis in FIG. 12 is represented by the pressure of brake fluid transferred out from the first hydraulic chamber 56a or the second hydraulic chamber 56b.

During normal operation when the vehicle brake system 10 normally operates, no matter whether or not a hydraulic brake pressure has been generated in the master cylinder 34, the first shut-off valve 60a and the second shut-off valve 60b, which are normally open type solenoid valves, turn into a valve close state by being magnetically excited, and the third shut-off valve 62, which is a normally closed type solenoid valve, turns into a valve open state by being magnetically excited (see FIG. 2). Accordingly, as the first hydraulic system 70a and the second hydraulic system 70b are shut off by the first shut-off valve 60a and the second shut-off valve 60b, it does not occur that a hydraulic brake pressure generated by the master cylinder 434 of the vehicular hydraulic-pressure generation device 14 in the fourth embodiment is transferred to the wheel cylinders 32FR, 32RL, 32RR, and 32FL of the disk brake mechanisms 30a-30d.

In this situation, when a hydraulic brake pressure is generated in the second hydraulic chamber 56b of the master cylinder 34, the generated hydraulic brake pressure is transferred through the branched hydraulic passage 58c and the third shut-off valve 62, which is in the valve open state, to the reaction-force hydraulic chamber 65 of the first stroke simulator 64. The hydraulic brake pressure supplied to the hydraulic chamber 65 displaces the simulator piston 67 against the spring forces of the springs 68a and 68b, and a stroke of the brake pedal 12 is thereby allowed and a pseudo petal reaction force is generated to be fed back to the brake pedal 12. As a result, a brake feeling without a strange feeling for a driver can be obtained.

When the load input to the master cylinder 434 increases by the driver's pedaling of the brake pedal 12, as shown in FIG. 12, accompanying this increase, the stroke amounts (master cylinder stroke [mm3]) of the first and second pistons 440a, 440b both increase.

When the load input to the master cylinder 434 increases by the operator's pedaling of the brake pedal 12 and the opposite side, opposite to the push rod 42, of the second piston 440b reaches the bottom at the inner wall portion of the master cylinder 434, the master cylinder stroke [mm3] comes to increase little, as shown in FIG. 12.

After the opposite side, opposite to the push rod 42, of the second piston 440b reaches the bottom at the inner wall portion of the master cylinder 434, if a further load is applied to the master cylinder 434 by the driver's strong pedaling of the brake pedal 12, the hydraulic pressure in the first hydraulic chamber 56a rapidly increases, as shown in FIG. 12.

For the vehicular hydraulic-pressure generation device 14 in the fourth embodiment, the second hydraulic chamber 456b is communicated with the reaction-force hydraulic chamber 65, wherein the maximum value of the hydraulic pressure generated in the second hydraulic chamber 456b is set smaller than the maximum value of the hydraulic pressure generated in the first hydraulic chamber 456a.

Accordingly, by a vehicular braking-force generation device 10 provided with the vehicular hydraulic-pressure generation device 14 in the fourth embodiment, it is unnecessary to use material or component elements with special specifications with a high strength, a high durability, and the like, as the material for the first stroke simulator 64, the material for the branched hydraulic passage 58c for connecting the master cylinder 434 and the first stroke simulator 64, and the third shut-off valve 62 disposed on the branched hydraulic passage 58c, and thus the degree of freedom of selecting materials and component elements is increased. As a result, the manufacturing cost of the vehicular braking-force generation device 10 can be further reduced.

In the vehicular hydraulic-pressure generation device 14 in the fourth embodiment, until immediately before the opposite side, opposite to the push rod 42, of the second piston 440b reaches the bottom at the inner wall portion of the master cylinder 434, the first stroke simulator 64 operates in a normal state. Accordingly, by the vehicular hydraulic-pressure generation device 14 in the fourth embodiment, reduction effect on a feeling of strangeness at the time of braking operation can be obtained, similarly to the case of the vehicular hydraulic-pressure generation device 14 in the first embodiment.

For the vehicular hydraulic-pressure generation device 14 in the fourth embodiment, the maximum capacity A (see FIG. 11) of the second hydraulic chamber 456b of the master cylinder (the hydraulic pressure generation section) 434 is set smaller than the maximum capacity B (see FIG. 11) of the reaction-force hydraulic chamber 65.

Accordingly, by the vehicular braking-force generation device 10 provided with the vehicular hydraulic-pressure generation device 14 in the fourth embodiment, it does not occur that the simulator piston 67 of the first stroke simulator 64 reaches bottom before the second piston 440b of the master cylinder 434 reaches bottom. In other words, at the time the second piston 440b of the master cylinder 434 has reached bottom, the simulator piston 67 of the first stroke simulator 64 has a room until when the first stroke simulator 64 reaches bottom.

Conversely, it will be assumed as a comparative example that the maximum capacity A of the second hydraulic chamber 456b of the master cylinder 434 is set larger than the maximum capacity B of the reaction-force hydraulic chamber 65. Then, in contrast to the case of the vehicular hydraulic-pressure generation device 14 in the fourth embodiment, the second piston 440b of the master cylinder 434 in this comparative example reaches bottom after the simulator piston 67 of the first stroke simulator 64 reaches bottom.

In this case of comparative example, even after the simulator piston 67 has reached bottom, the second piston 440b can move forward in the housing 434a of the master cylinder 434. In this case, as a heavy load is applied to the housing 64a itself of the first stroke simulator 64, a strength corresponding to the heavy load is required for the housing 64a.

In this point, by the vehicular braking-force generation device 10 provided with the vehicular hydraulic-pressure generation device 14 in the fourth embodiment, as the simulator piston 67 does not reach bottom even after the second piston 440b reaches bottom, it is possible to prevent in advance that a heavy load is applied to the housing 64a itself of the first stroke simulator 64.

Further, arrangement may be made such that an vehicular braking-force generation device 10 includes the vehicular hydraulic-pressure generation device 14 in the fourth embodiment and a motor cylinder device (electric hydraulic pressure generation section) 16 that is communicated with the first hydraulic chamber 456a and the second hydraulic chamber 456b of the master cylinder (hydraulic pressure generation section) 434 through the first shut-off valve (a shut-off valve) 60a and is electrically operated, wherein provided is a pressure sensor (a hydraulic pressure detection section) Pm for detecting the hydraulic pressure of the first hydraulic passage (a hydraulic passage) 58a communicating between the first hydraulic chamber 456a and the first shut-off valve (a shut-off valve) 60a.

Further, arrangement may be made such that the first brake system 110a includes a first out valve 128 and a second out valve 130 as pressure reducing valves on the first shared hydraulic passage (a communication passage) 112 and the second shared hydraulic passage (a communication passage) 114 that makes communication between the wheel cylinders 32FR, 32RL and a reservoir 132 for brake fluid, wherein, in case of operating the master cylinder (a hydraulic pressure generation section) 434 in a state that the first shut-off valve (a shut-off valve) 60a is open, the first out valve (a pressure reducing valve) 128 and the second out valve (a pressure reducing valve) 130 reduce the hydraulic pressure related to the wheel cylinders 32FR, 32RL communicated with the first hydraulic chamber 456*a*.

In the vehicular braking-force generation device 10 provided with the vehicular hydraulic-pressure generation device 14 in the fourth embodiment, the master cylinder 434 is operated in a state that the first shut-off valve 60*a* is open at the time of abnormality of the motor cylinder device 16 or the like, and the hydraulic pressure in the first hydraulic passage 58*a* is detected and monitored by the pressure sensor Pm. In this situation, when the hydraulic pressure in the first hydraulic passage 58*a* during detection and monitoring excesses a certain threshold, the control section (not shown) of the vehicular braking-force generation device 10 can decrease the hydraulic pressure by opening the first out valve 128 and the second out valve 130 and thus introducing the brake fluid into the reservoir 132. Incidentally, in this situation, the first invalve 120 and the second invalve 124 are closed by the control section.

Accordingly, by the vehicular braking-force generation device 10 provided with the vehicular hydraulic-pressure generation device 14 in the fourth embodiment, in operating the master cylinder 34 in a state that the first shut-off valve 60*a* is open at the time of abnormality of the motor cylinder device 16 or the like, it is possible to make the maximum value of the hydraulic pressure generated in the second hydraulic chamber 56*b* and the maximum value of the hydraulic pressure generated in the first hydraulic chamber 56*a* agree with each other, by decreasing the hydraulic pressure in the first hydraulic passage 58*a*.

[Configuration of Vehicular Hydraulic-Pressure Generation Device 14 in Fifth Embodiment of the Invention]

Figure 13:
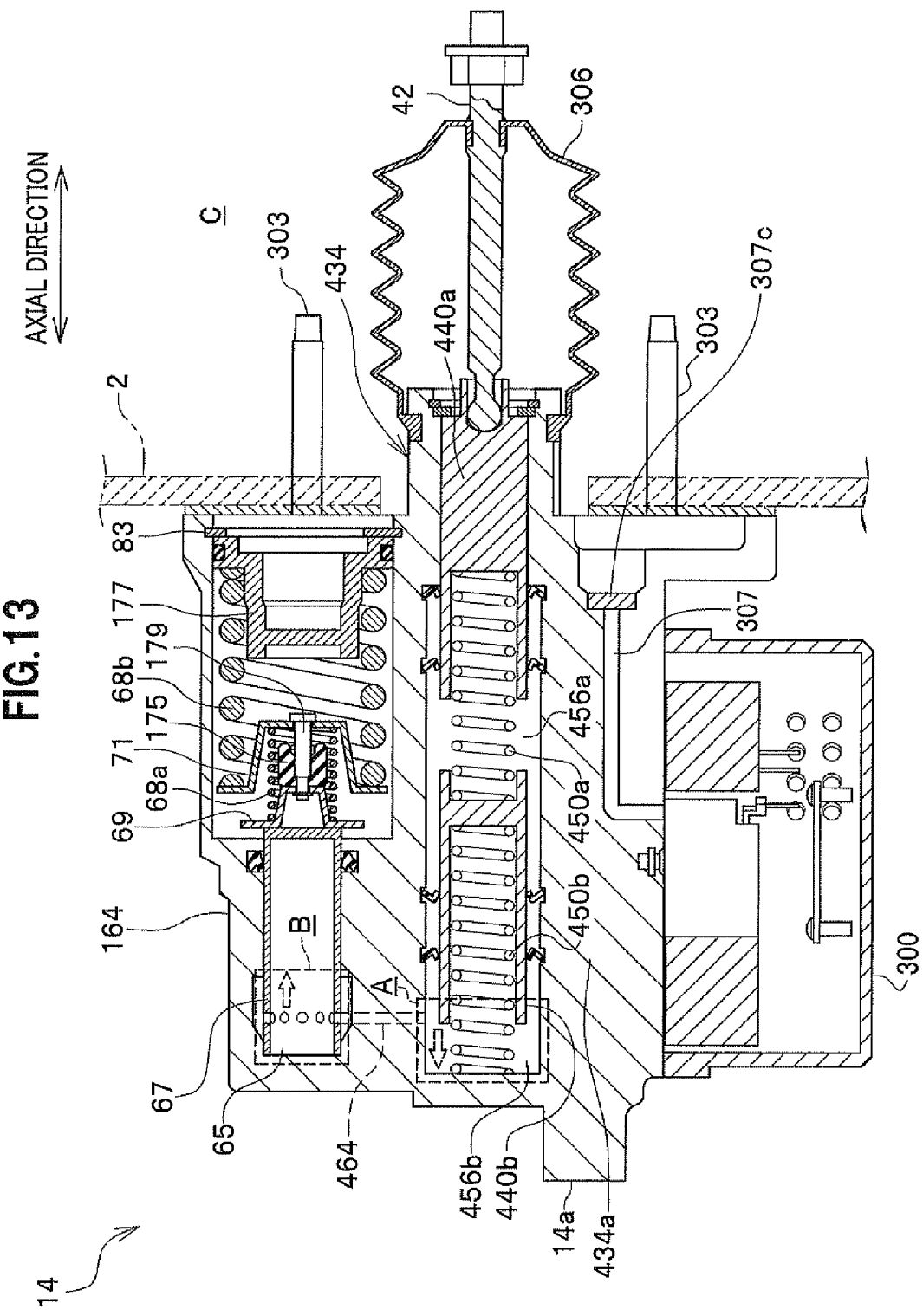
FIG. 13 is a vertical cross-sectional view of a vehicular hydraulic-pressure generation device provided with a second stroke simulator in a fifth embodiment.

In the following, a vehicular hydraulic-pressure generation device 14 in a fifth embodiment of the present invention will be described in detail, referring to FIG. 13. FIG. 13 is a vertical cross-sectional view of the vehicular hydraulic-pressure generation device 14 in a firth embodiment provided with the second stroke simulator 164 shown in FIG. 7.

The vehicular hydraulic-pressure generation device 14 (see FIG. 11) in the fourth embodiment and the vehicular hydraulic-pressure generation device 14 (see FIG. 13) in the fifth embodiment have common or corresponding basic elements therebetween. Accordingly, common symbols are assigned to elements virtually common therebetween, description of these elements will be omitted, and the following description will be focused on the difference therebetween.

The difference between the vehicular hydraulic-pressure generation device 14 (see FIG. 11) in the fourth embodiment and the vehicular hydraulic-pressure generation device 14 (see FIG. 13) in the fifth embodiment is that, while the first stroke simulator 64 is provided in the fourth embodiment, a second stroke simulator 164 is provided in the fifth embodiment. The operation and advantages of the second stroke simulator 164 are the same as described in the second embodiment.

[Operation and Advantages of Vehicular Hydraulic-Pressure Generation Device 14 in Fifth Embodiment]

For the vehicular hydraulic-pressure generation device 14 in the fifth embodiment, similarly to the case of the vehicular hydraulic-pressure generation device 14 in the fourth embodiment, the second hydraulic chamber 456*b* is communicated with the reaction-force hydraulic chamber 65, wherein the maximum value of the hydraulic pressure generated in the second hydraulic chamber 456*b* is set smaller than the maximum value of the hydraulic pressure generated in the first hydraulic chamber 456*a*.

Accordingly, by a vehicular braking-force generation device 10 provided with the vehicular hydraulic-pressure generation device 14 in the fifth embodiment, it is unnecessary to use material or component elements with special specifications with a high strength, a high durability, and the like, as the material for the second stroke simulator 164, the material for the branched hydraulic passage 58*c* for connecting the master cylinder 434 and the second stroke simulator 164, and the third shut-off valve 62 disposed on the branched hydraulic passage 58*c*, and thus the degree of freedom of selecting materials and component elements is increased. As a result, the manufacturing cost of the vehicular braking-force generation device 10 can be further reduced.

In the vehicular hydraulic-pressure generation device 14 in the fifth embodiment, until immediately before the opposite side, opposite to the push rod 42, of the second piston 440*b* reaches the bottom at the inner wall portion of the master cylinder 434, the second stroke simulator 164 operates in a normal state. Accordingly, by the vehicular hydraulic-pressure generation device 14 in the fifth embodiment, reduction effect on a feeling of strangeness at the time of braking operation can be obtained, similarly to the case of the vehicular hydraulic-pressure generation device 14 in the second embodiment.

[Configuration of Vehicular Hydraulic-Pressure Generation Device 14 in Sixth Embodiment of the Invention]

Figure 14:
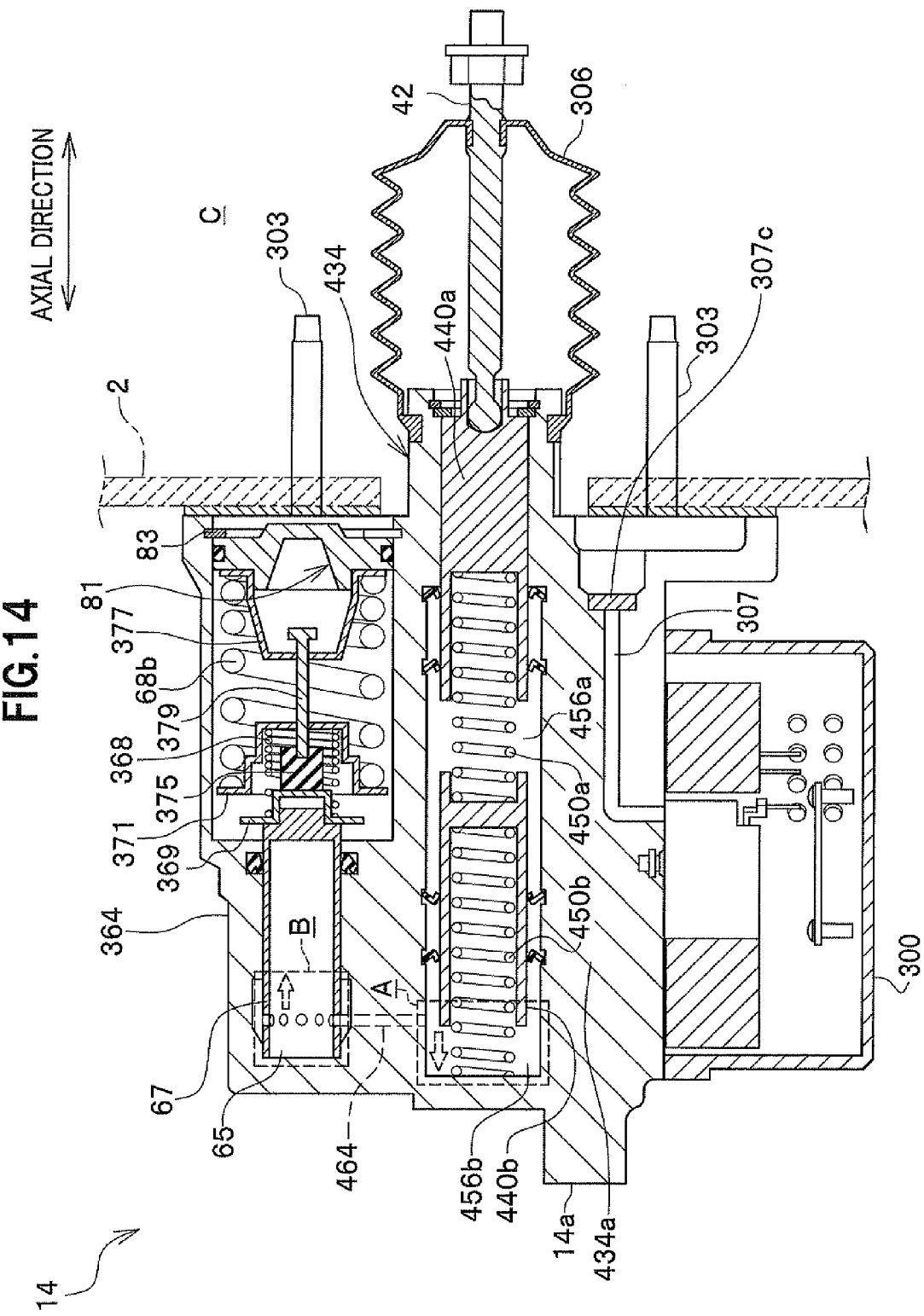
FIG. 14 is a vertical cross-sectional view of a vehicular hydraulic-pressure generation device provided with a third stroke simulator in a sixth embodiment.

In the following, a vehicular hydraulic-pressure generation device 14 in a sixth embodiment of the present invention will be described in detail, referring to FIG. 14. FIG. 14 is a vertical cross-sectional view of the vehicular hydraulic-pressure generation device 14 in the sixth embodiment provided with the third stroke simulator 364 shown in FIG. 8 and FIG. 9.

The vehicular hydraulic-pressure generation device 14 (see FIG. 11) in the fourth embodiment and the vehicular hydraulic-pressure generation device 14 (see FIG. 14) in the sixth embodiment have common or corresponding basic elements therebetween. Accordingly, common symbols are assigned to elements virtually common therebetween, description of these elements will be omitted, and the following description will be focused on the difference therebetween.

The difference between the vehicular hydraulic-pressure generation device 14 (see FIG. 11) in the fourth embodiment and the vehicular hydraulic-pressure generation device 14 (see FIG. 14) in the sixth embodiment is that, while the first stroke simulator 64 is provided in the fourth embodiment, a third stroke simulator 364 is provided in the sixth embodiment. The operation and advantages of the third stroke simulator 364 are the same as described in the third embodiment.

[Operation and Advantages of Vehicular Hydraulic-Pressure Generation Device 14 in Sixth Embodiment]

For the vehicular hydraulic-pressure generation device 14 in the sixth embodiment, similarly to the vehicular hydraulic-pressure generation device 14 in the fourth embodiment, the second hydraulic chamber 456*b* is communicated with the reaction-force hydraulic chamber 65, and the maximum value of the hydraulic pressure generated in the second hydraulic chamber 456*b* is set lower than the maximum value of the hydraulic pressure generated in the first hydraulic chamber 456*a*.

Accordingly, by a vehicular braking-force generation device 10 provided with the vehicular hydraulic-pressure generation device 14 in the sixth embodiment, it is unnecessary to use material or component elements with special specifications with a high strength, a high durability, and the like, as the material for the third stroke simulator 364, the material for the branched hydraulic passage 58c for connecting the master cylinder 434 and the second stroke simulator 164, and the third shut-off valve 62 disposed on the branched hydraulic passage 58c, and thus the degree of freedom of selecting materials and component elements is increased. As a result, the manufacturing cost of the vehicular braking-force generation device 10 can be further reduced.

In the vehicular hydraulic-pressure generation device 14 in the sixth embodiment, until immediately before the opposite side, opposite to the push rod 42, of the second piston 440b reaches the bottom at the inner wall portion of the master cylinder 434, the third stroke simulator 364 operates in a normal state. Accordingly, by the vehicular hydraulic-pressure generation device 14 in the sixth embodiment, reduction effect on a feeling of strangeness at the time of braking operation can be obtained, similarly to the case of the vehicular hydraulic-pressure generation device 14 in the third embodiment.

[Other Embodiments]

The above-described plural embodiments are example of embodiments of the present invention. Accordingly, interpretation of the technical scope of the invention should not be limited thereto. This is because the invention can be carried out in various embodiments without departing from the spirit and main features of the invention.

For example, although the first and second embodiments have been described with an example providing easily-deformable portions 75d1a on one side, along the axial direction, of the first bush 75, the invention is not limited to this example. Arrangement may be made such as to provide easily-deformable portions 75d1a on both sides, along the axial direction, of the first bush 75. Further, although description has been made with an example providing four easily-deformable portions 75da1 on one side, along the axial direction, of the first bush 75, the invention is not limited to this example. Arrangement may be made such as to provide a single easily-deformable portion 75d1a (which is continuous along the circumferential direction), or an arbitrary number, such as two, three, five or the like, of easily-deformable portions 75d1a, on one side, along the axial direction, of the first bush 75.

Further, although the first and second embodiments have been described with an example where the first bush 75 has reaction force non-linear characteristic, the invention is not limited to this example. In another example, the first bush 75 is given reaction force linear characteristic, and reaction force linear characteristic created by compressive deformation of the first return spring 68a and reaction force linear characteristic created by compressive deformation of the first bush 75 are added to each other within the range of the second section I2. Thus, it is possible to obtain reaction force characteristic against the operation amount of the brake pedal 12, wherein the reaction force characteristic is obtained by connecting reaction-force linear characteristics in three stages. Such an embodiment is also included in the technical scope of the invention.

Incidentally, 'a section including a switching point (point Q) at which the reaction force linear characteristics according respectively to the first elastic modulus (k1) and the second elastic modulus (k2), the first and second elastic moduli being different from each other, are switched therebetween,' described in claim 3 refers to a concept including the second section I2.

Still further, although the unequal pitch spring 368 in the third embodiment has been described with an example setting the pitches P1, P2 different from each other for the front portion SF and the rear portion SR and thereby setting spring constants in two steps, the invention is not limited to this example. The number of steps of spring constant of an unequal pitch spring according to the invention may also be arranged such as to have a number of steps larger than two.

Yet further, for the unequal pitch spring 368 in the third embodiment, in setting the number of steps of spring constant of the unequal pitch spring according to the invention into multiple steps, regions with respective different spring constants may be set in an order from larger spring constants to smaller spring constants, or from smaller spring constants to larger spring constants along the longitudinal direction of the spring, or regions with respective different spring constants may be disposed at random.

Further, although, in the fourth to sixth embodiments, description has been made with an example in which the first and second out valves 128, 130 as pressure reducing valves and the reservoir 132, which configure the VSA device 18, are used to decrease the hydraulic pressure in the first brake system 110a, the invention is not limited to this example. According to the invention, arrangement may be made, for example, such as to provide a pressure reducing valve and/or a pressure reducing circuit at a certain point on a hydraulic passage between the connection port 20a and the wheel cylinders 32FR, 32RL.

DESCRIPTION OF REFERENCE SYMBOLS

10: vehicular brake system (vehicular braking-force generation device)
12: brake pedal (brake operation member)
14: vehicular hydraulic-pressure generation device
16: motor cylinder device (electric hydraulic pressure generation section)
34: master cylinder (hydraulic pressure generation section)
40a: first piston
40b: second piston
56a: first hydraulic chamber
56b: second hydraulic chamber
60a: first shut-off valve (shut-off valve)
64: first stroke simulator (reaction force generation section)
65: reaction-force hydraulic chamber
66: cylinder portion
67: simulator piston
68a: first return spring (elastic portion, first elastic portion)
68b: second return spring (elastic portion, second elastic portion)
69: first spring seat member
71: second spring seat member
75: first bush (elastic portion, third elastic portion)
75b: hollow portion
75d1: first easily-deformable portion (easily-deformable portion)
75e: annular stepped portion: second easily-deformable portion (easily-deformable portion)
75g: tapered portion: third easily-deformable portion (easily-deformable portion)
75h: tapered portion: third easily-deformable portion (easily-deformable portion)
77: third spring seat member
79: first rod member
81: lid portion
164: second stroke simulator (reaction force generation section)
177: third spring seat member
179: second rod member
364: third stroke simulator (reaction force generation section)

368: unequal pitch spring (spring member, first elastic portion, third elastic portion)
369: first spring seat member
371: second spring seat member (spring seat member)
375: resin member
377: third spring seat member
379: third rod member
440a: first piston
440b: second piston
434: master cylinder (hydraulic pressure generation section)
456a: first hydraulic chamber
456b: second hydraulic chamber
I1: first section
I2: second section
Pm: pressure sensor (hydraulic pressure detection section)

The invention claimed is:

1. A vehicular braking-force generation device, comprising:
   a hydraulic pressure generation section for generating a hydraulic pressure corresponding to an operation amount of a brake operation member by a driver; and
   a reaction force generation section communicated with the hydraulic pressure generation section to generate, against the driver, a reaction force corresponding to the operation amount of the brake operation member,
   wherein the reaction force generation section includes a simulator piston that is operated to move in a forward direction or in a backward direction, corresponding to the hydraulic pressure generated by the hydraulic pressure generation section, the simulator piston being housed in a simulator housing,
   wherein the hydraulic pressure generation section includes:
   a first piston and a second piston provided to be forward and backward movable in a master cylinder, in association with the brake operation member;
   a first hydraulic chamber partitioned by an inner wall portion of the master cylinder, the first piston, and the second piston; and
   a second hydraulic chamber partitioned by the inner wall portion of the master cylinder and the second piston, the second hydraulic chamber being communicated with the reaction force generation section,
   wherein a maximum value of hydraulic pressure generated in the second hydraulic chamber is set smaller than a maximum value of hydraulic pressure generated in the first hydraulic chamber,
   and wherein, when the second piston reaches a bottom of the master cylinder by an operation of the driver, the simulator piston does not yet reach a bottom of the simulator housing.

2. The vehicular braking-force generation device according to claim 1, comprising:
   an electric hydraulic pressure generation section that is communicated with the first hydraulic chamber and the second hydraulic chamber of the hydraulic pressure generation section through a shut-off valve, and is electrically operated,
   wherein provided is a hydraulic pressure detection section for detecting a hydraulic pressure of a hydraulic passage communicating between the first hydraulic chamber and the shut-off valve.

3. The vehicular braking-force generation device according to claim 2,
   wherein a pressure reducing valve is provided on a communicating passage communicating between a wheel cylinder and a reservoir of brake fluid,
   and wherein, when the hydraulic pressure generation section is operated in a state that the shut-off valve is open, the pressure reducing valve decreases a hydraulic pressure in a wheel cylinder that is communicated with the first hydraulic chamber.

4. A vehicular braking-force generation device, comprising:
   a hydraulic pressure generation section for generating a hydraulic pressure corresponding to an operation amount of a brake operation member by a driver; and
   a reaction force generation section communicated with the hydraulic pressure generation section to generate, against the driver, a reaction force corresponding to the operation amount of the brake operation member,
   wherein the reaction force generation section includes a simulator piston that is operated to move in a forward direction or in a backward direction, corresponding to the hydraulic pressure generated by the hydraulic pressure generation section, the simulator piston being housed in a simulator housing,
   wherein the hydraulic pressure generation section includes:
   a first piston and a second piston provided to be forward and backward movable in a master cylinder, in association with the brake operation member;
   a first hydraulic chamber partitioned by an inner wall portion of the master cylinder, the first piston, and the second piston; and
   a second hydraulic chamber partitioned by the inner wall portion of the master cylinder and the second piston,
   wherein the reaction force generation section comprises a reaction force hydraulic chamber for introducing thereto a hydraulic pressure discharged from the second hydraulic chamber,
   wherein the capacity of the second hydraulic chamber is smaller than the capacity of the reaction force hydraulic chamber,
   and wherein, when the second piston reaches a bottom of the master cylinder by an operation of the driver, the simulator piston does not yet reach a bottom of the simulator housing.

5. The vehicular braking-force generation device according to claim 4, comprising:
   an electric hydraulic pressure generation section that is communicated with the first hydraulic chamber and the second hydraulic chamber of the hydraulic pressure generation section through a shut-off valve, and is electrically operated,
   wherein provided is a hydraulic pressure detection section for detecting a hydraulic pressure of a hydraulic passage communicating between the second hydraulic chamber and the shut-off valve.

6. The vehicular braking-force generation device according to claim 5,
   wherein a pressure reducing valve is provided on a communicating passage communicating between a wheel cylinder and a reservoir of brake fluid,
   and wherein, when the hydraulic pressure generation section is operated in a state that the shut-off valve is open, the pressure reducing valve decreases a hydraulic pressure in a wheel cylinder that is communicated with the second hydraulic chamber.

* * * * *